(12) United States Patent
Sato et al.

(10) Patent No.: US 12,252,052 B2
(45) Date of Patent: Mar. 18, 2025

(54) VEHICLE SLOPE APPARATUS

(71) Applicant: AISIN CORPORATION, Kariya (JP)

(72) Inventors: Eisuke Sato, Kariya (JP); Tomoyuki Kato, Kariya (JP)

(73) Assignee: AISIN CORPORATION, Kariya (JP)

( * ) Notice: Subject to any disclaimer, the term of this patent is extended or adjusted under 35 U.S.C. 154(b) by 447 days.

(21) Appl. No.: 17/732,858

(22) Filed: Apr. 29, 2022

(65) Prior Publication Data

US 2022/0371498 A1 Nov. 24, 2022

(30) Foreign Application Priority Data

May 19, 2021 (JP) ................................. 2021-084458

(51) Int. Cl.
*B60P 1/43* (2006.01)
*B60R 3/02* (2006.01)

(52) U.S. Cl.
CPC ................ *B60P 1/431* (2013.01); *B60R 3/02* (2013.01)

(58) Field of Classification Search
CPC .......... B60P 1/431; B60P 1/433; A61G 3/067; A61G 3/061
See application file for complete search history.

(56) References Cited

U.S. PATENT DOCUMENTS

| | | | | |
|---|---|---|---|---|
| 5,775,232 | A * | 7/1998 | Golemis | B61D 23/025 105/458 |
| 6,010,298 | A * | 1/2000 | Cohn | A61G 3/061 414/921 |
| 6,802,095 | B1 * | 10/2004 | Whitmarsh | B60P 1/433 14/71.3 |
| 7,052,227 | B2 * | 5/2006 | Navarro | B60P 1/431 414/537 |
| 2006/0245883 | A1 * | 11/2006 | Fontaine | A61G 3/067 414/537 |
| 2015/0052693 | A1 * | 2/2015 | Allen | B65G 69/28 14/71.1 |
| 2019/0106042 | A1 * | 4/2019 | Hill | B60P 1/431 |
| 2020/0122642 | A1 * | 4/2020 | Sato | B60R 3/02 |
| 2021/0000666 | A1 * | 1/2021 | Smith | B60P 1/431 |
| 2021/0170933 | A1 * | 6/2021 | Smith | B60P 1/431 |
| 2021/0323458 | A1 * | 10/2021 | Kato | B60P 1/4492 |
| 2022/0218541 | A1 * | 7/2022 | Oya | A61G 3/065 |
| 2022/0371412 | A1 * | 11/2022 | Bettcher, III | B60J 5/06 |
| 2022/0410674 | A1 * | 12/2022 | Kanasugi | B60J 5/0479 |

FOREIGN PATENT DOCUMENTS

JP 2020-164142 A 10/2020

* cited by examiner

*Primary Examiner* — Kaitlin S Joerger
(74) *Attorney, Agent, or Firm* — Oblon, McClelland, Maier & Neustadt, L.L.P.

(57) ABSTRACT

A vehicle slope apparatus includes a slope plate configured to be deployed at a lower end of a door opening portion, a guide rail extending in deployment and housing directions of the slope plate, a moving member configured to move along an extending direction of the guide rail, a support arm rotatably connected to a rear end of the slope plate and rotatably connected to the moving member, and a lift mechanism configured to lift the rear end of the slope plate by rotating the support arm in a state where the slope plate is deployed. The support arm is provided with a roller configured to hold a moving posture of the slope plate by being in sliding contact with the guide rail in a state where the slope plate is moved integrally with the moving member.

8 Claims, 21 Drawing Sheets

HOUSED STATE

DEPLOYED STATE

BEFORE LIFT-UP

AFTER LIFT-UP

VEHICLE SLOPE APPARATUS

CROSS REFERENCE TO RELATED APPLICATIONS

This application is based on and claims priority under 35 U.S.C. § 119 to Japanese Patent Application 2021-084458, filed on May 19, 2021, the entire content of which is incorporated herein by reference.

TECHNICAL FIELD

This disclosure relates to a vehicle slope apparatus.

BACKGROUND DISCUSSION

In the related art, a vehicle slope apparatus is known in which a slope plate is deployed at a lower end of a door opening portion. For example, a slope apparatus described in JP 2020-164142A (Reference 1) includes a guide rail that extends in deployment and housing directions of a slope plate, and a moving member that is moved along an extending direction of the guide rail. In addition, the slope apparatus includes a support arm that is rotatably connected to a rear end of the slope plate and is rotatably connected to a drive shoe, and a lift mechanism that rotates the support arm. Further, in the slope apparatus, the support arm rotates due to an operation of the lift mechanism, and thereby the rear end of the slope plate deployed at the lower end of the door opening portion is lifted up. Accordingly, the slope plate forms a ramp such that the rear end is brought closer to a vehicle floor.

In addition, in the slope apparatus in the related art, the support arm is in sliding contact with the guide rail in a state where the slope plate is moved together with the moving member. Accordingly, a moving posture of the slope plate is stably held by restricting the rotation of the support arm.

However, in the above configuration in the related art, there is a problem that sliding resistance increases since the support arm is in sliding contact with the guide rail.

SUMMARY

According to an aspect of this disclosure, a vehicle slope apparatus includes: a slope plate configured to be deployed at a lower end of a door opening portion; a guide rail extending in deployment and housing directions of the slope plate; a moving member configured to move along an extending direction of the guide rail; a support arm rotatably connected to a rear end of the slope plate and rotatably connected to the moving member; and a lift mechanism configured to lift the rear end of the slope plate by rotating the support arm in a state where the slope plate is deployed. The support arm is provided with a roller configured to hold a moving posture of the slope plate by being in sliding contact with the guide rail in a state where the slope plate is moved integrally with the moving member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle slope apparatus will be described with reference to the drawings.

Figure 1:
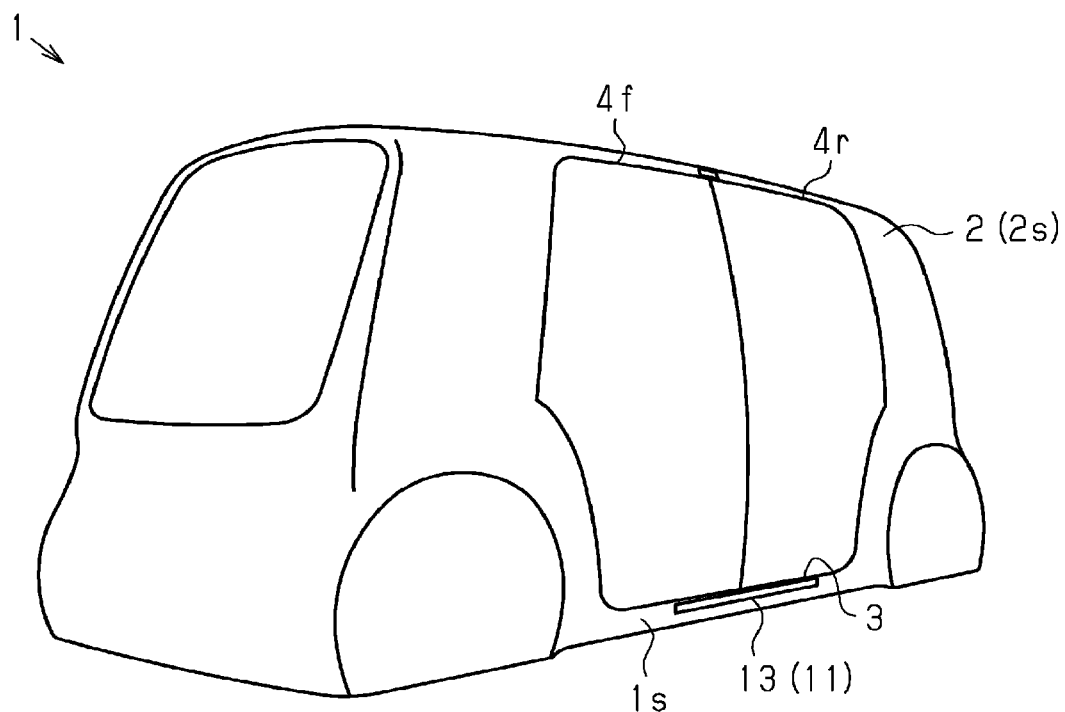
FIG. 1 is a perspective view of a vehicle equipped with a slope apparatus.
Figure 2:
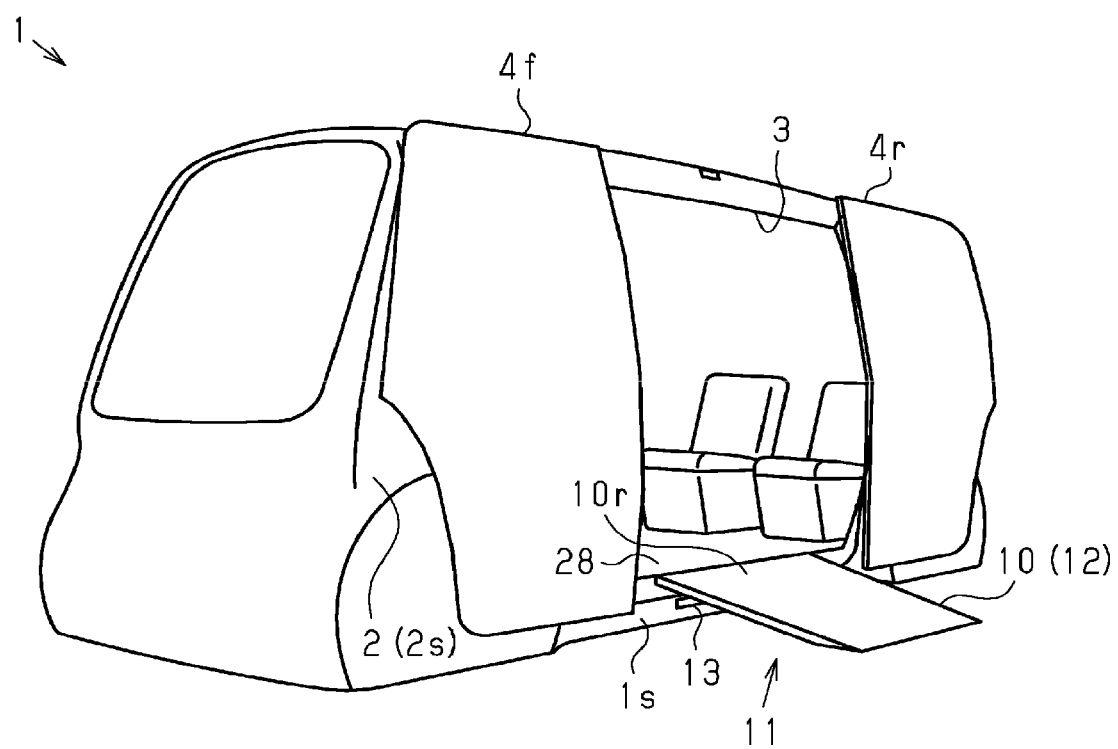
FIG. 2 is a perspective view of the vehicle equipped with the slope apparatus.

As shown in FIGS. 1 and 2, a vehicle 1 according to the present embodiment includes a substantially rectangular box-shaped vehicle body 2 extending in a front-rear direction of the vehicle. In addition, a door opening portion 3, which serves as an entrance and exit for an occupant, is provided on a side surface 2s of the vehicle body 2. The door opening portion 3 is provided with a pair of slide doors 4f, 4r that perform opening/closing operations in opposite directions in the front-rear direction of the vehicle.

That is, the slide door 4f on a front side of the vehicle is moved to the front side of the vehicle so as to perform the opening operation, and is moved to a rear side of the vehicle so as to perform the closing operation. On the other hand, the slide door 4r on the rear side of the vehicle is moved to the rear side of the vehicle so as to perform the opening operation, and is moved to the front side of the vehicle so as to perform the closing operation. Further, each of the slide doors 4f, 4r has a configuration as a power slide door device that performs the opening and closing operations based on a driving force of an actuator (not shown). The vehicle 1 according to the present embodiment is configured to open and close the door opening portion 3 such that the slide doors 4f, 4r are moved in conjunction.

The vehicle 1 according to the present embodiment includes a slope apparatus 11 that deploys a slope plate 10 at a lower end of the door opening portion 3 when the door opening portion 3 is in an opened state. In the vehicle 1 according to the present embodiment, even when an occupant holds, for example, a wheelchair, a stroller, a carry case or the like, the occupant can easily get on or off the vehicle from the door opening portion 3 by using a ramp 12 formed by the slope plate 10.

Figure 3:
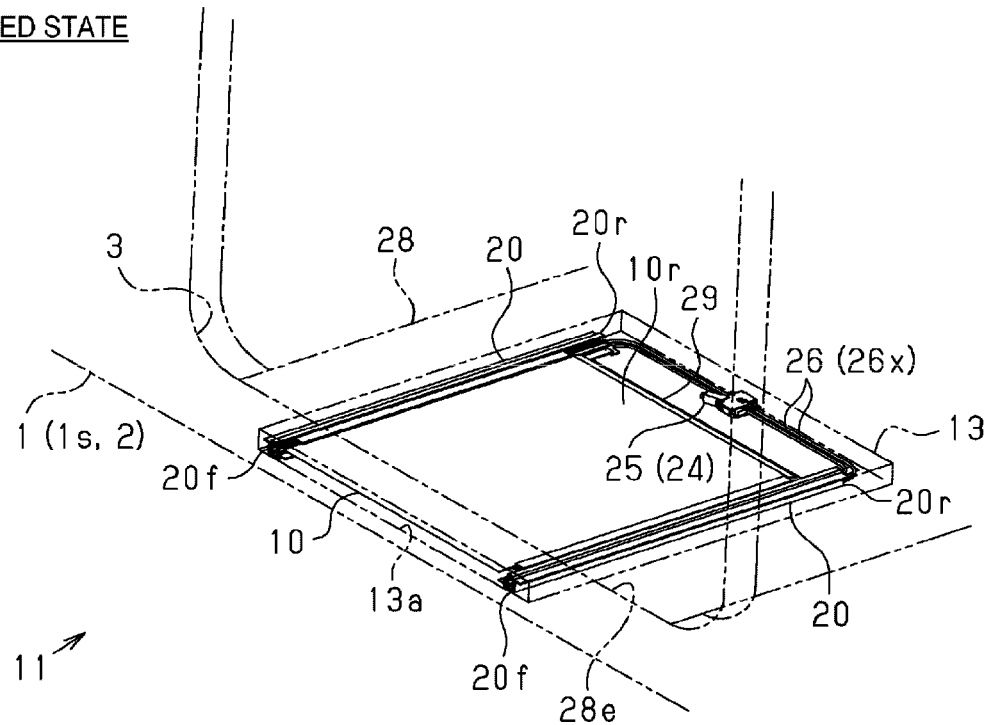
FIG. 3 is a perspective view of the slope apparatus provided below a door opening portion.
Figure 4:
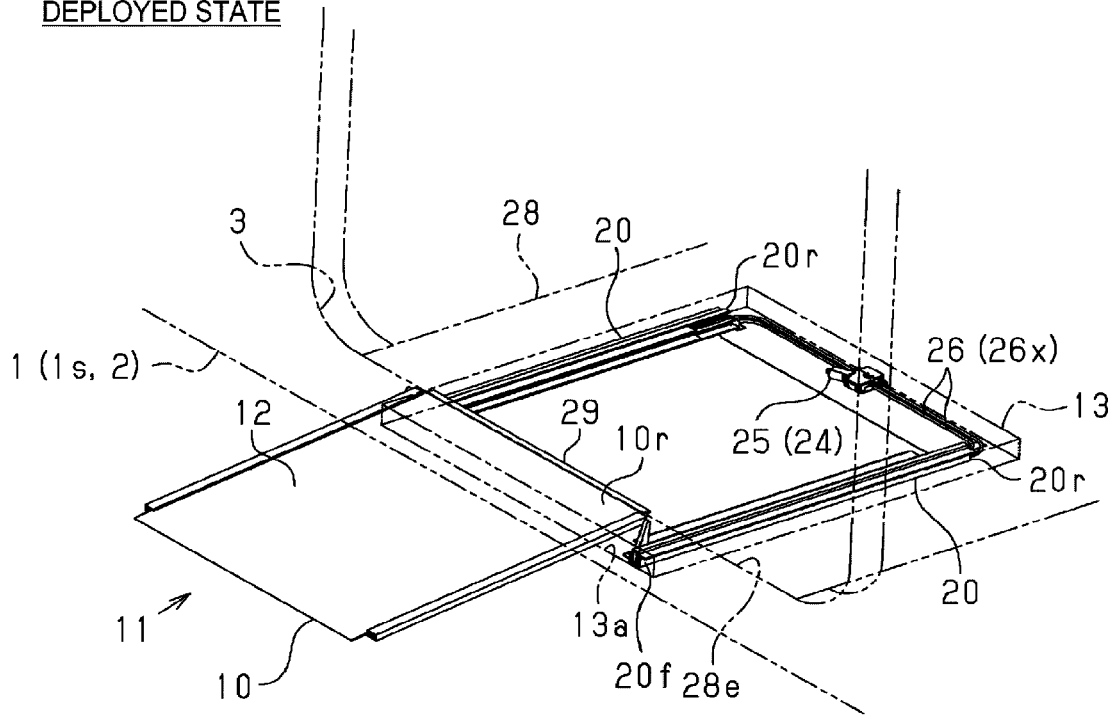
FIG. 4 is a perspective view of the slope apparatus provided below the door opening portion.

As shown in FIGS. 3 and 4, in the vehicle 1 according to the present embodiment, the slope apparatus 11 is provided in a housing box 13 as a housing portion provided in the vehicle body 2 below the door opening portion 3. Specifically, the housing box 13 includes an opening portion 13a facing the same direction as the door opening portion 3. In the slope apparatus 11 according to the present embodiment, via the opening portion 13a, the slope plate 10 housed in the housing box 13 is deployed to the outside of the vehicle, and the deployed slope plate 10 is housed into the housing box 13 again.

In detail, the slope apparatus 11 according to the present embodiment includes a pair of guide rails 20, 20 extending from the housing box 13 in deployment and housing directions of the slope plate 10 deployed at the lower end of the door opening portion 3, that is, in a depth direction in the housing box 13.

Figure 5:
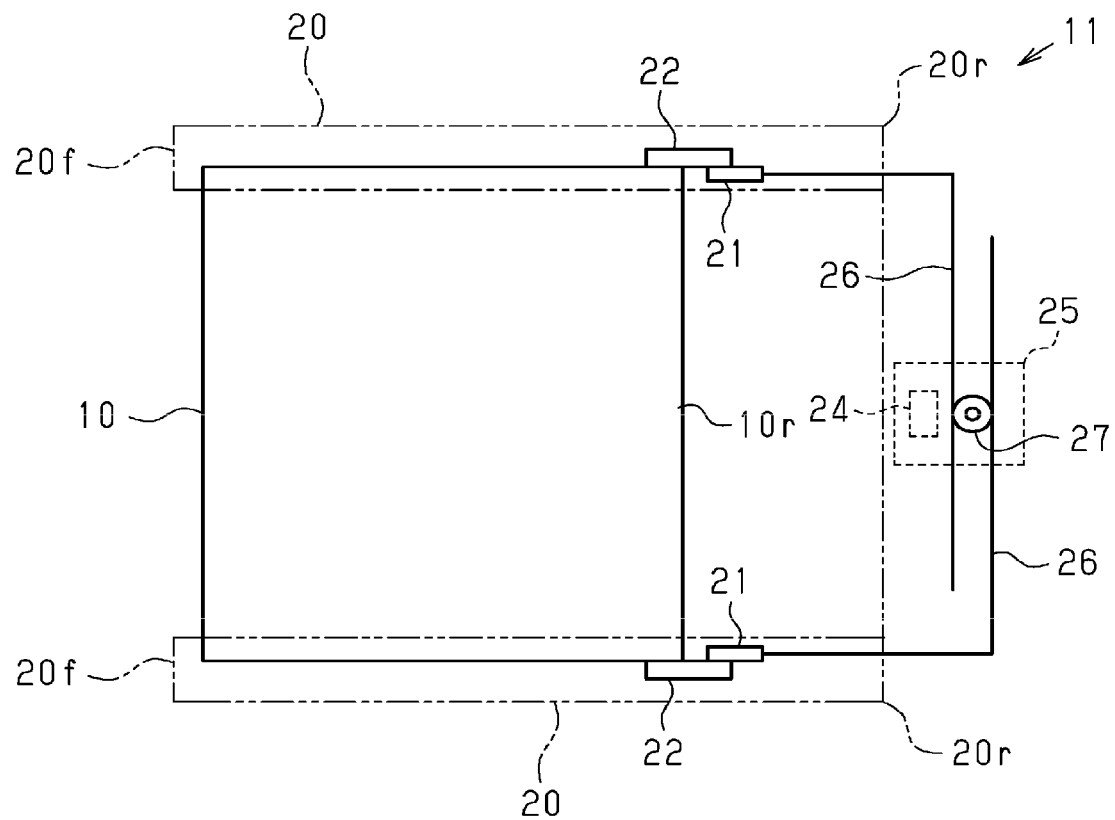
FIG. 5 is a schematic configuration diagram of the slope apparatus.

As shown in FIGS. 3 to 5, in the slope apparatus 11 according to the present embodiment, the guide rails 20, 20 are disposed substantially in parallel such that the guide rails 20, 20 sandwich the slope plate 10 in the housing box 13 from both sides in a width direction. In addition, the slope apparatus 11 according to the present embodiment includes a pair of moving members 21, 21 that are provided so as to be slidable in a state of being engaged with the guide rails 20 along an extending direction of the engaged guide rails 20, 20. In addition, the slope apparatus 11 includes a pair of support arms 22, 22 that are rotatably connected to a rear end 10r of the slope plate 10 and are rotatably connected to the moving members 21. That is, in the slope apparatus 11 according to the present embodiment, the slope plate 10 and the moving members 21, 21 are connected via the support arms 22, 22. Accordingly, in the slope apparatus 11 according to the present embodiment, the slope plate 10 is moved in the deployment and housing directions in conjunction with the moving members 21, 21.

Further, the slope apparatus 11 according to the present embodiment includes an actuator 25 that uses a motor 24 as a drive source and applies a driving force to the slope plate 10. In the slope apparatus 11 according to the present embodiment, the actuator 25 is disposed in the housing box 13 deeper than rear ends 20r of the guide rails 20, 20. Further, the slope apparatus 11 according to the present embodiment includes a pair of drive cables 26, 26 that are routed along the extending direction of the guide rails 20, 20. In the slope apparatus 11 according to the present embodiment, the drive cables 26, 26 are routed from the actuator 25 to the rear ends 20r of the guide rails 20, 20 by being inserted into casing pipes 26x, 26x. In the slope apparatus 11 according to the present embodiment, the moving members 21, 21 are moved along the extending direction of the guide rails 20, 20 based on the driving force of the actuator 25 transmitted via the drive cables 26, 26.

Specifically, the actuator 25 according to the present embodiment includes a drive gear 27 that rotates based on a driving force generated by the motor 24. Further, the actuator 25 is configured such that the drive cables 26, 26 mesh with the drive gear 27 at two positions sandwiching the drive gear 27 in a radial direction thereof. That is, the actuator 25 according to the present embodiment slides the drive cables 26, 26 along the extending direction of the guide rails 20, 20 by rotating the drive gear 27. Further, in the slope apparatus 11 according to the present embodiment, the moving members 21, 21 are connected to end portions of the drive cables 26, 26. Accordingly, in the slope apparatus 11 according to the present embodiment, the moving members 21, 21 slide integrally with the drive cables 26, 26 in the deployment and housing directions of the slope plate 10 in a state where the moving members 21, 21 are guided by the guide rails 20, 20.

Figure 6:
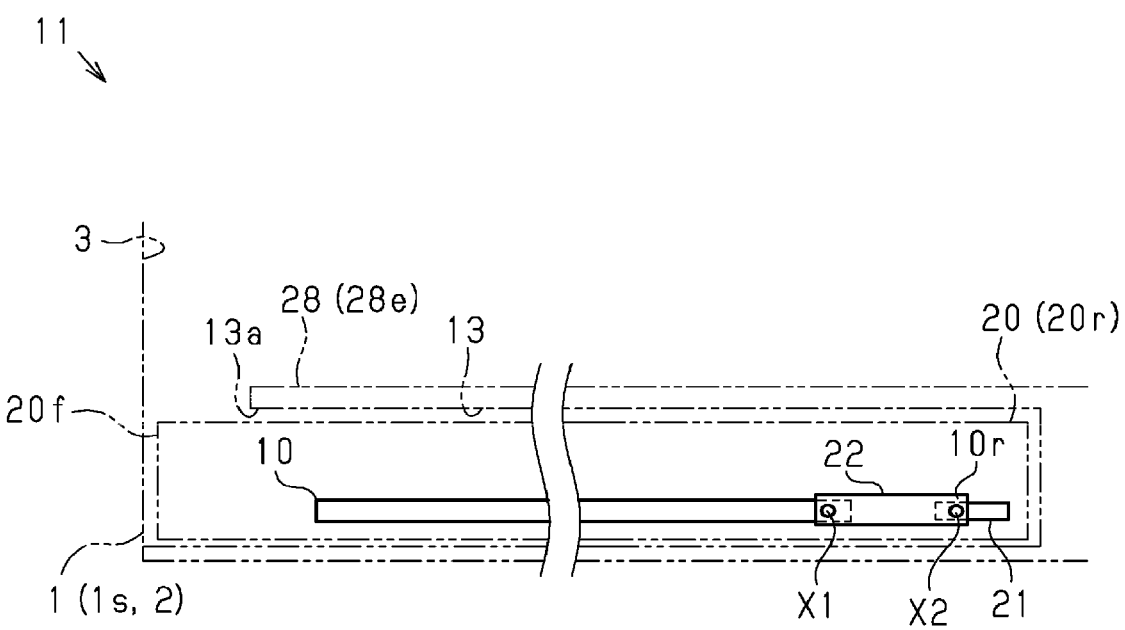
FIG. 6 is a diagram illustrating an operation of the slope apparatus.
Figure 7:
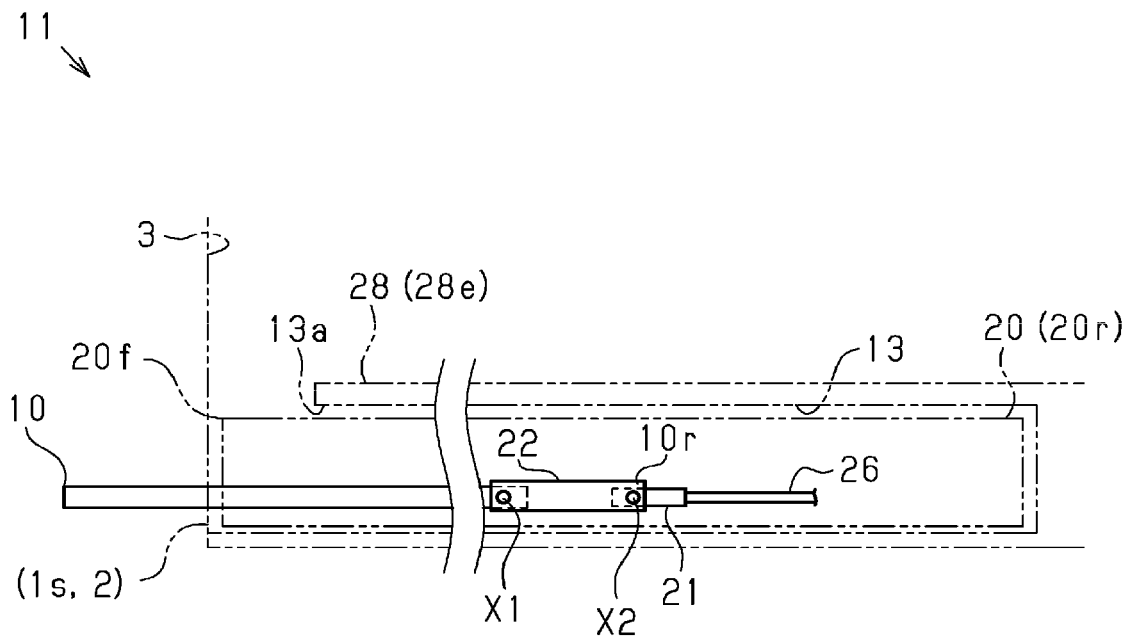
FIG. 7 is a diagram illustrating an operation of the slope apparatus.

In detail, as shown in FIGS. 6 and 7, in the slope apparatus 11 according to the present embodiment, the slope plate 10 is housed in the housing box 13, in a state where a substantially horizontal posture is maintained, based on the engagement force of the moving members 21 and the support arms 22 with respect to the guide rails 20. Further, in the slope apparatus 11 according to the present embodiment, the slope plate 10 moves in the deployment and housing directions integrally with the moving members 21 and the support arms 22 along the extending direction of the guide rails 20 while maintaining the substantially horizontal posture.

Figure 8:
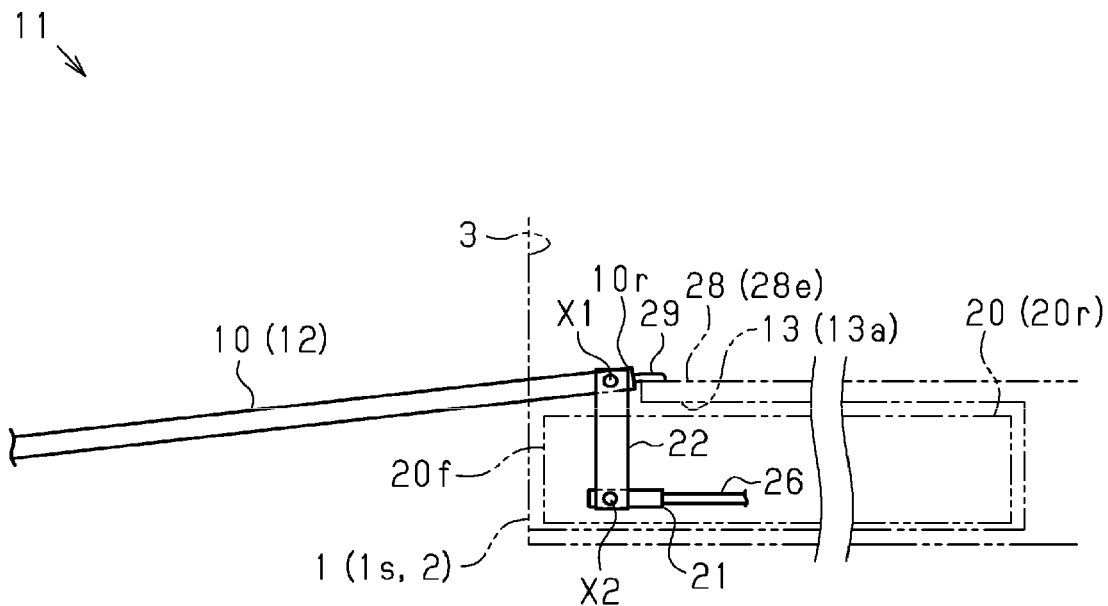
FIG. 8 is a diagram illustrating an operation of the slope apparatus.
Figure 9:
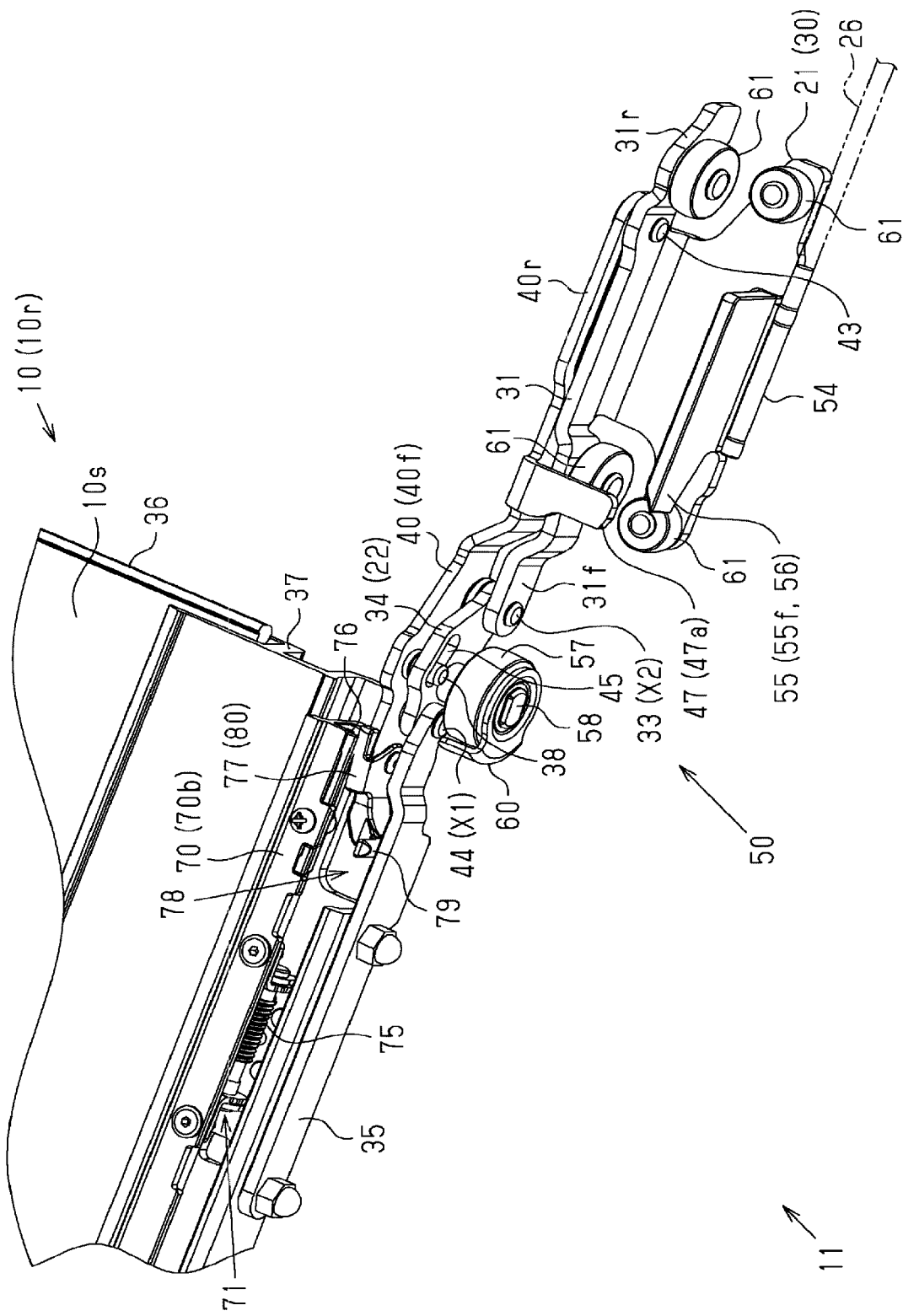
FIG. 9 is a perspective view of the slope apparatus in the vicinity of a lift mechanism.
Figure 10:
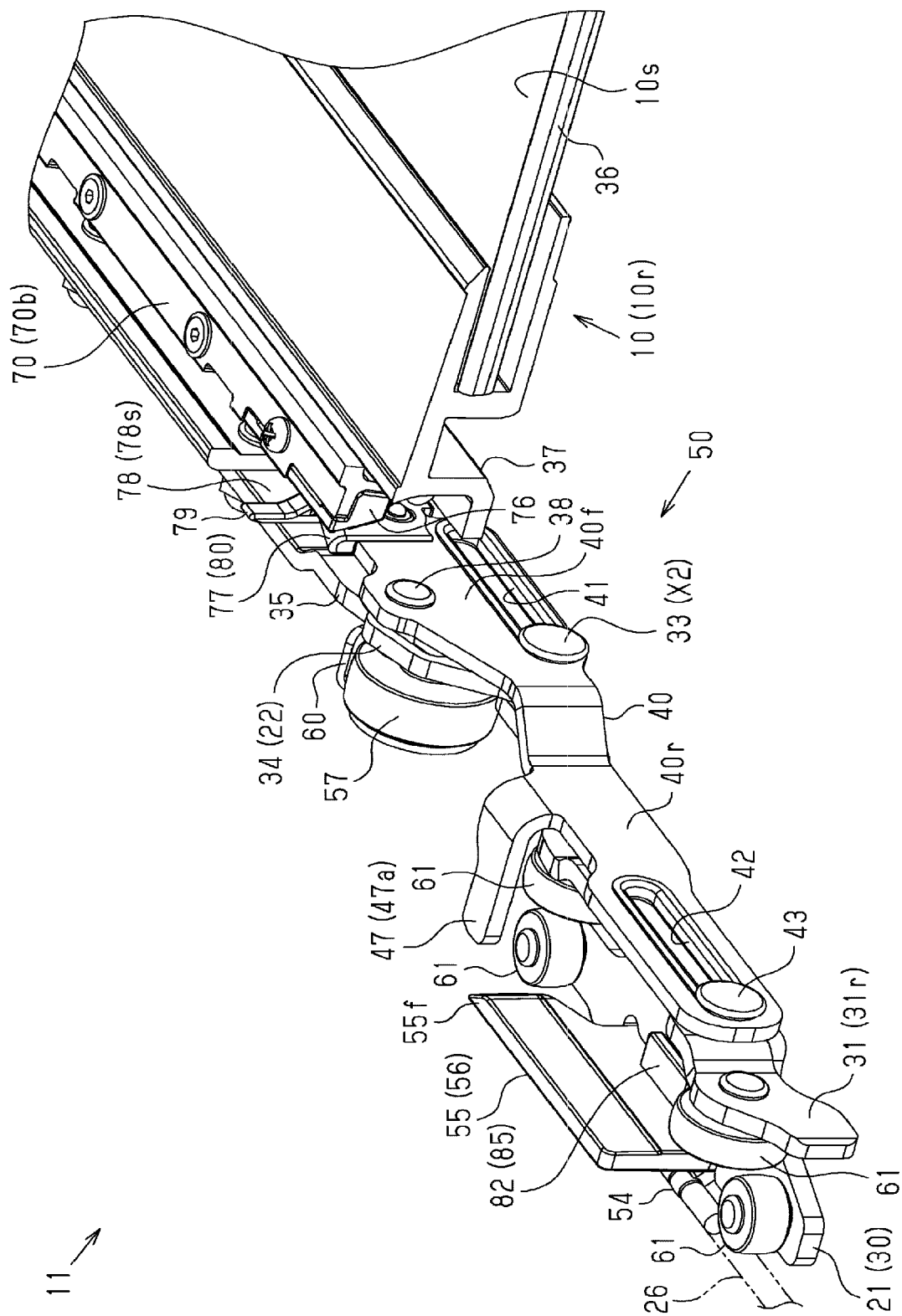
FIG. 10 is a perspective view of the slope apparatus in the vicinity of the lift mechanism.

As shown in FIG. 8, in the slope apparatus 11 according to the present embodiment, the slope plate 10 is deployed to the outside of the vehicle to extend outward in a vehicle width direction from a side edge portion 1s of the vehicle 1 provided with the housing box 13. Further, in the slope apparatus 11 according to the present embodiment, in this state, the support arms 22 interposed between the moving members 21 and the slope plate 10 rotates to lift the rear end 10r of the slope plate 10. Accordingly, in the slope apparatus 11 according to the present embodiment, the slope plate 10 forms the ramp 12 in a state where the rear end 10r is brought closer to a vehicle floor 28.

In the slope apparatus 11 according to the present embodiment, a floor engagement portion 29 is provided at the rear end 10r of the slope plate 10. Further, in the slope apparatus 11 according to the present embodiment, the floor engagement portion 29 is engaged with an edge portion 28e of the vehicle floor 28, and thus the vehicle floor 28 supports a load of the slope plate 10.

Lift Mechanism

Next, a connection structure of the slope plate 10 and the moving members 21, and a lift mechanism in the slope apparatus 11 according to the present embodiment will be described.

As shown in FIGS. 9 to 14, the moving member 21 according to the present embodiment include a lateral plate portion 30 having a substantially plate shape and a vertical wall portion 31 erected at one end of the lateral plate portion 30. In the slope apparatus 11 according to the present embodiment, the moving member 21 is formed by plastically processing a metal plate. Accordingly, the moving member 21 according to the present embodiment is formed to have a substantially L-folded plate shape.

In the moving member 21 according to the present embodiment, a support shaft 33 is provided at a front end 31f of the vertical wall portion 31. The slope apparatus 11 according to the present embodiment includes link members 34 each of which is rotatably and pivotally supported by the support shaft 33.

In the slope apparatus 11 according to the present embodiment, the link member 34 has a substantially plate shape. Further, the slope apparatus 11 according to the present embodiment includes a substantially plate-shaped and elongated side plate 35 that is rotatably connected to the link member 34 at a position separated from a connection position of the link member 34 with respect to the support shaft 33. In the slope apparatus 11 according to the present embodiment, the side plate 35 is integrally fixed to the rear end 10r of the slope plate 10. Accordingly, in the slope apparatus 11 according to the present embodiment, the link member 34 functions as the support arm 22 that is rotatably connected to the rear end 10r of the slope plate 10 and are rotatably connected to the moving member 21.

Specifically, the slope plate 10 according to the present embodiment includes a panel member 36 that constitutes a slope surface 12s in the ramp 12 formed by the slope plate 10 at the lower end of the door opening portion 3. The slope plate 10 further includes a pair of side frames 37, 37 that extend in a front-rear direction of the slope plate 10 in a state of sandwiching both sides of the panel member 36 in a width direction. Further, the side plate 35 is fixed to a side end surface of the side frame 37 in a state where the elongated plate shape extends in an extending direction of the side frame 37. Accordingly, in the slope apparatus 11 according to the present embodiment, an end portion of the rear end 10r in a width direction of the slope plate 10 is formed by the side plate 35 and the side frame 37.

Further, as shown in FIGS. 9 to 12 and FIGS. 15 to 18, the slope apparatus 11 according to the present embodiment includes driven members 40 each of which is moved together with the link member 34 along the extending direction of the guide rail 20.

In detail, the driven member 40 has an elongated folded plate shape and includes a first vertical plate portion 40f and a second vertical plate portion 40r disposed at positions displaced in the width direction of the guide rail 20. In addition, the width direction of the guide rail 20 can be rephrased as the width direction of the slope plate 10. In the slope apparatus 11 according to the present embodiment, the driven member 40 is disposed at a lateral side of the moving member 21 along the vertical wall portion 31. Further, the driven member 40 includes a connecting shaft 38 for the link member 34 provided on the first vertical plate portion 40f. That is, in the slope apparatus 11 according to the present embodiment, a driving force applied to the moving member 21 is transmitted to the driven member 40 via the link member 34 and the connecting shaft 38. Accordingly, the driven member 40 according to the present embodiment is moved together with the link member 34 along the extending direction of the guide rail 20.

In more detail, the driven member 40 according to the present embodiment includes an elongated hole 41 provided in the first vertical plate portion 40f and an elongated hole 42 provided in the second vertical plate portion 40r. Specifically, the elongated holes 41, 42 are provided to extend in a longitudinal direction of the driven member 40 disposed along the vertical wall portion 31 of the moving member 21. In addition, the moving member 21 according to the present embodiment includes an engagement shaft 43 protruded in the vicinity of a rear end 31r of the vertical wall portion 31. Further, the driven member 40 according to the present embodiment is disposed at the lateral side of the moving member 21 in a state where the engagement shaft 43 is inserted into the elongated hole 42 of the second vertical plate portion 40r and the support shaft 33 provided at the front end 31f of the vertical wall portion 31 is inserted into the elongated hole 41 of the first vertical plate portion 40f.

In the link member 34 according to the present embodiment, one end in an longitudinal direction is rotatably connected to a support shaft 44 provided on the side plate 35, and the other end in the longitudinal direction is rotatably connected to the support shaft 33 provided on the vertical wall portion 31 of the moving member 21. Accordingly, in the slope apparatus 11 according to the present embodiment, first rotation connecting points X1 between the slope plate 10 and the support arms 22 and second rotation connecting points X2 between the support arms 22 and the moving members 21 are formed.

In addition, the link member 34 according to the present embodiment includes an elongated hole 45 extending in the longitudinal direction of the link member 34 at a position between the first rotation connecting point X1 and the second rotation connecting point X2. In the slope apparatus 11 according to the present embodiment, the connecting shaft 38 provided on the first vertical plate portion 40f of the driven member 40 is inserted into the elongated hole 45.

Further, each of the support shafts 33, 44, the connecting shaft 38 and the engagement shaft 43 has flange shapes at both ends in an axial direction thereof. Accordingly, in the slope apparatus 11 according to the present embodiment, the vertical wall portion 31 of the moving member 21, the link member 34, the side plate 35 and the driven member 40 are stably connected.

Figure 11:
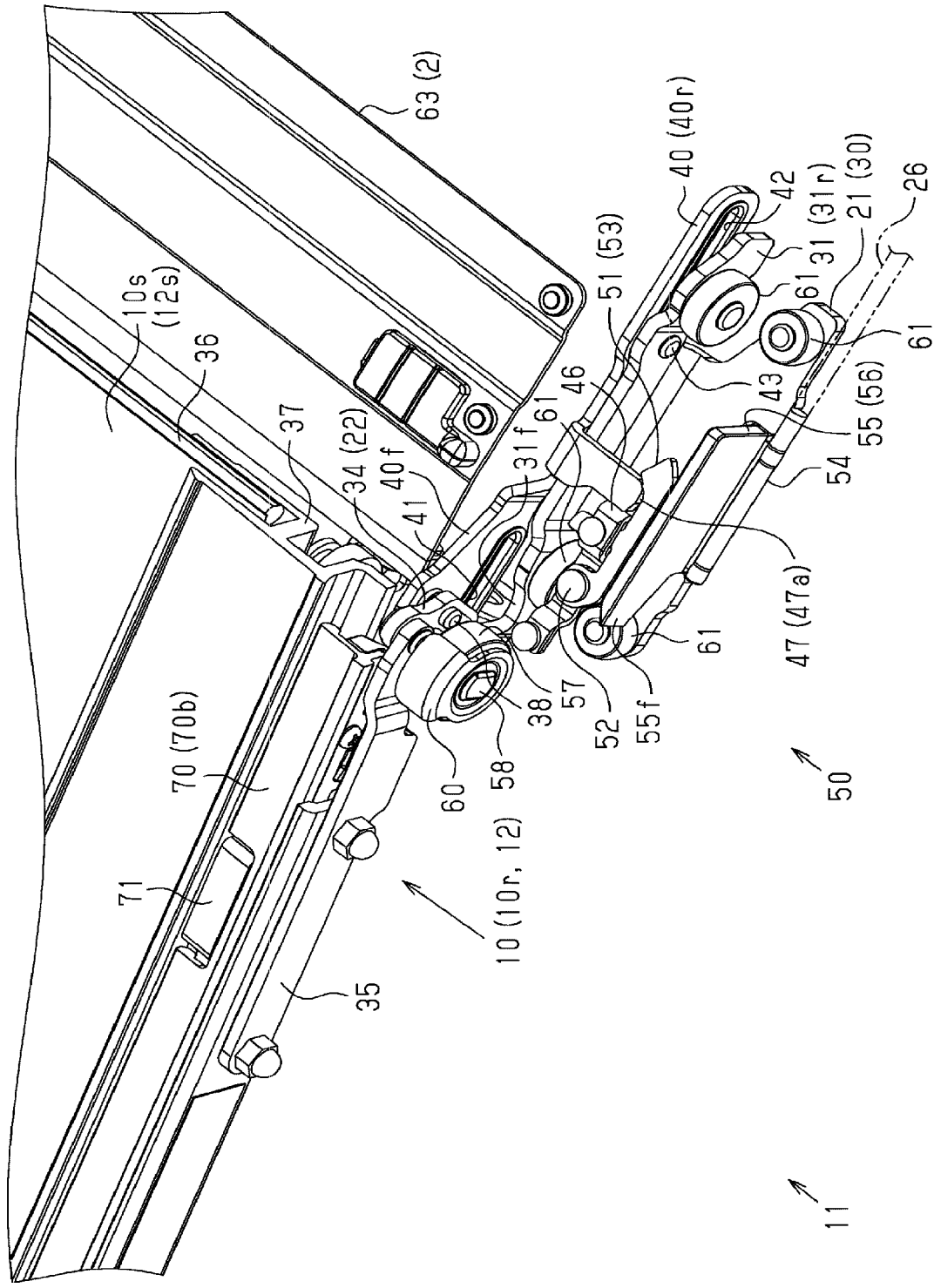
FIG. 11 is a perspective view of the slope apparatus in the vicinity of the lift mechanism.
Figure 12:
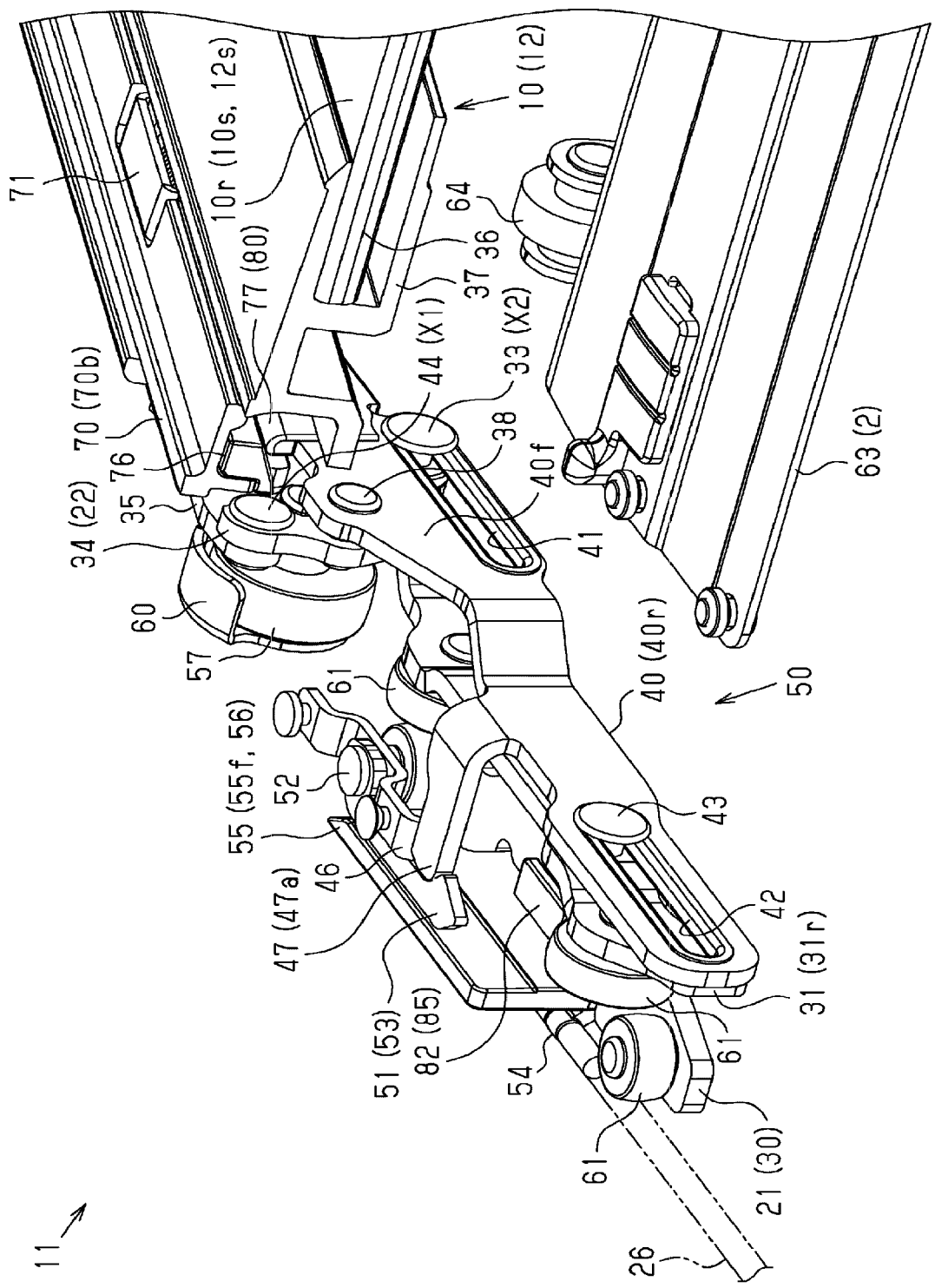
FIG. 12 is a perspective view of the slope apparatus in the vicinity of the lift mechanism.
Figure 13:
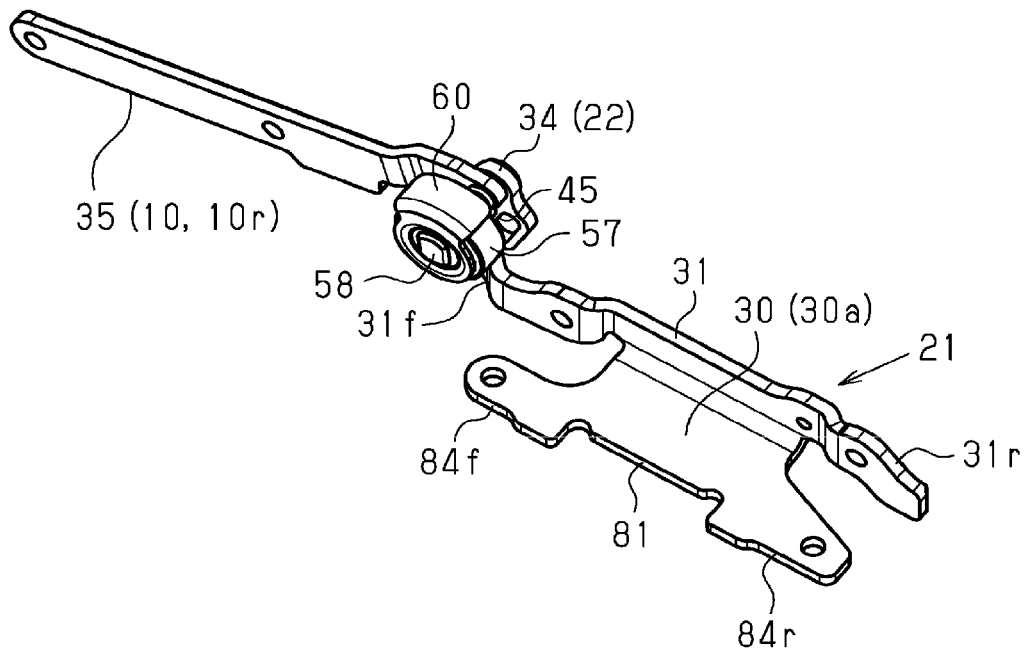
FIG. 13 is a perspective view of a side plate constituting an end in a width direction of a slope plate, a link member constituting a support arm, a moving member, a roller and a roller cover.
Figure 14:
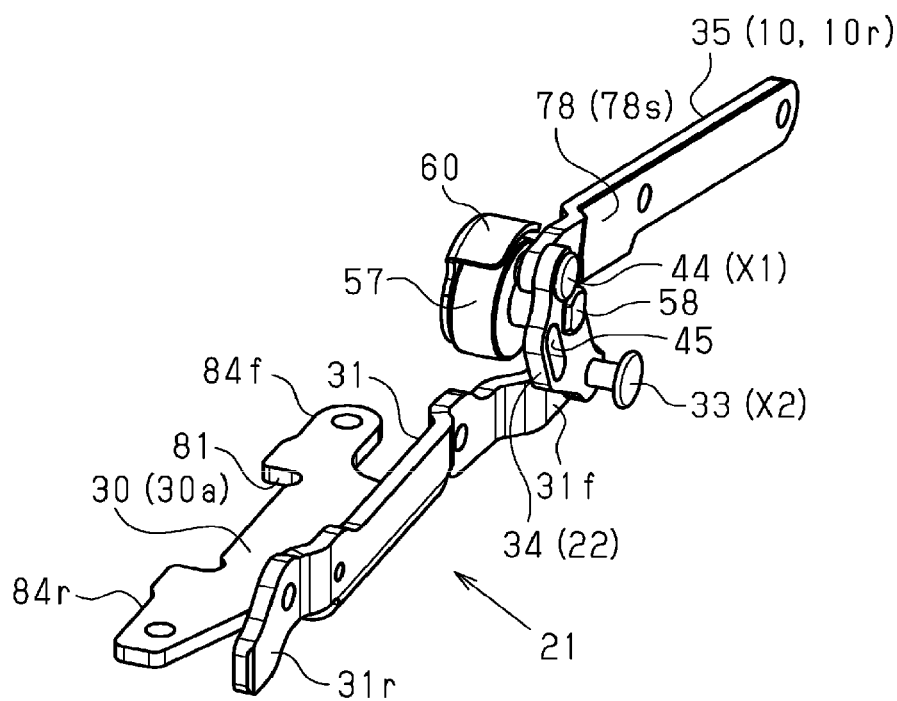
FIG. 14 is a perspective view of the side plate, the link member, the moving member, the roller and the roller cover.

Further, as shown in FIGS. 11 and 12, the slope apparatus 11 according to the present embodiment includes deployment stoppers 46 each of which restricts movement of the driven member 40 by abutting with the driven member 40 moving toward the deployment direction together with the link member 34 constituting the support arm 22. In the slope apparatus 11 according to the present embodiment, the deployment stopper 46 is provided in the vicinity of a front end 20f of the guide rail 20 (see FIGS. 3 to 8). Accordingly, in the slope apparatus 11 according to the present embodiment, a moving position of the driven member 40 in the deployment direction, that is, from the rear end 20r of the guide rail 20 toward the front end 20f is fixed in a state where the slope plate 10 is deployed at the lower end of the door opening portion 3.

In detail, as shown in FIGS. 9 to 12 and FIG. 18, the driven member 40 according to the present embodiment includes a substantially plate-shaped engaging piece 47 that extends above the moving member 21 in a state of facing the lateral plate portion 30 from a top end portion of the second vertical plate portion 40r. In the slope apparatus 11 according to the present embodiment, the driven member 40 is moved to the front end 20f of the guide rail 20 toward the deployment direction of the slope plate 10, and thereby the engaging piece 47 abuts with the deployment stopper 46.

Figure 15:
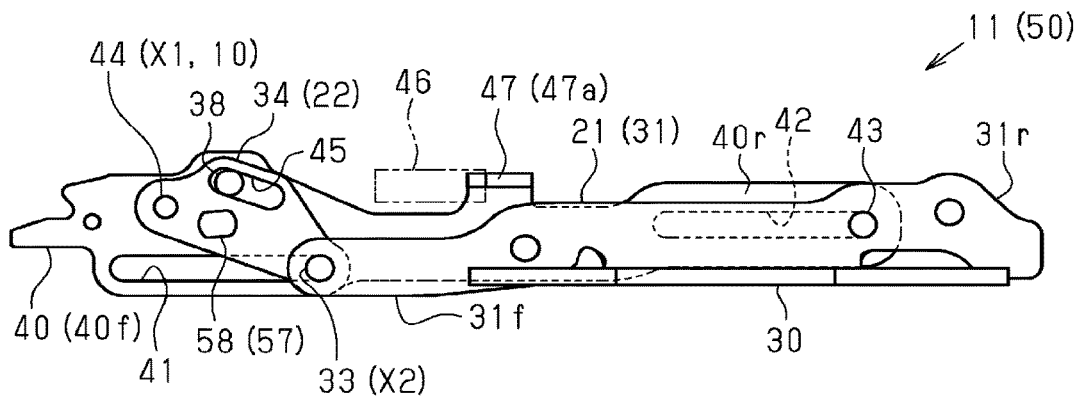
FIG. 15 is a side view of the lift mechanism.
Figure 16:
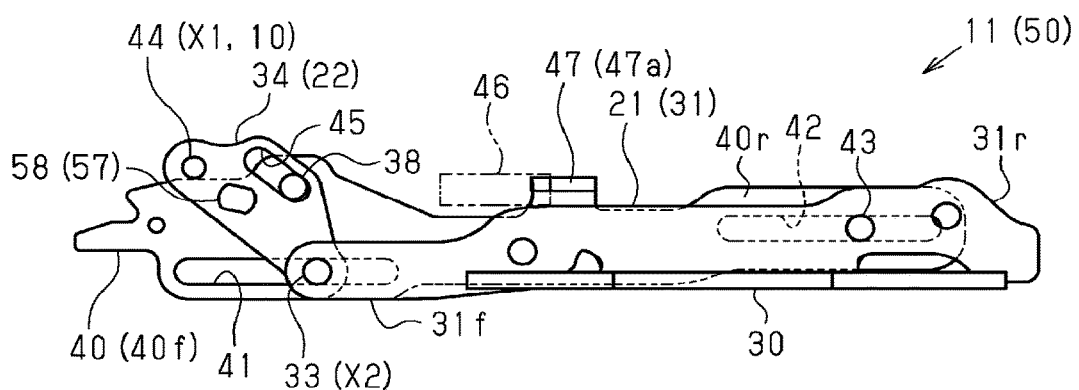
FIG. 16 is a side view of the lift mechanism.
Figure 17:
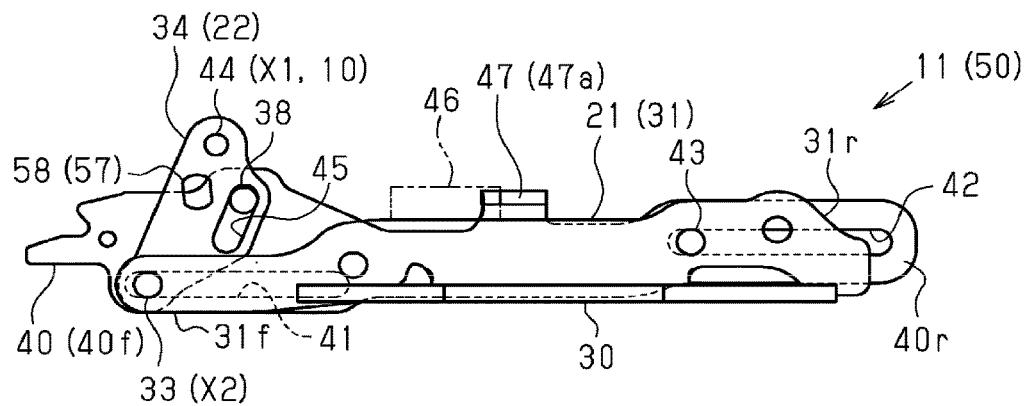
FIG. 17 is a side view of the lift mechanism.

As shown in FIGS. 15 to 17, in the slope apparatus 11 according to the present embodiment, the moving member 21 is further moved toward the deployment direction from a state where the movement of the driven member 40 toward the deployment direction is restricted.

That is, the moving member 21 according to the present embodiment is allowed to move relative to the driven member 40 along the extending direction of the guide rail 20 by moving the support shaft 33 and the engagement shaft 43 inserted into the elongated holes 41, 42 of the driven member 40 in the elongated holes 41, 42. Further, the movement of the moving member 21 relative to the driven member 40 changes the disposition of the connecting shaft 38 inserted into the elongated hole 45 of the link member 34. Specifically, the position of the connecting shaft 38 disposed in the elongated hole 45 apparently moves from a first rotation connecting point X1 side to a second rotation connecting point X2 side in the longitudinal direction of the elongated hole 45 (from left to right in FIGS. 15 to 17). Accordingly, in the slope apparatus 11 according to the present embodiment, the link members 34 constituting the support arms 22 rotate around the connecting shafts 38 of the driven members 40, and thus a lift mechanism 50 that lifts up the rear end 10r of the slope plate 10 is formed.

In addition, in the slope apparatus 11 according to the present embodiment, the support shaft 33 of the link member 34 that constitutes the second rotation connecting point X2 provided on the moving member 21 moves in the deployment direction exceeding the connecting shaft 38 of the driven member 40 whose movement in the deployment direction is restricted by the deployment stopper 46. At this time, the position of the connecting shaft 38 disposed in the elongated hole 45 apparently moves from the second rotation connecting point X2 side to the first rotation connecting point X1 side in the longitudinal direction of the elongated hole 45 again. Accordingly, by ensuring a large amount of rotation in the link member 34, the rear end 10r of the slope plate 10 lifted up due to the rotation of the link member 34 can be brought closer to the edge portion 28e of the vehicle floor 28.

Further, as shown in FIGS. 11 and 12, the slope apparatus 11 according to the present embodiment includes engagement levers 51 each of which is to be engaged with the engaging piece 47 in a state where the engaging piece 47 of the driven member 40 abuts with the deployment stopper 46. Specifically, the engagement lever 51 is engaged with the engaging piece 47 such that the engaging piece 47 is sandwiched between the engagement lever 51 and the deployment stopper 46. Accordingly, in the slope apparatus 11 according to the present embodiment, the movement of the driven member 40 toward the housing direction is restricted by the engagement lever 51.

Figure 18:
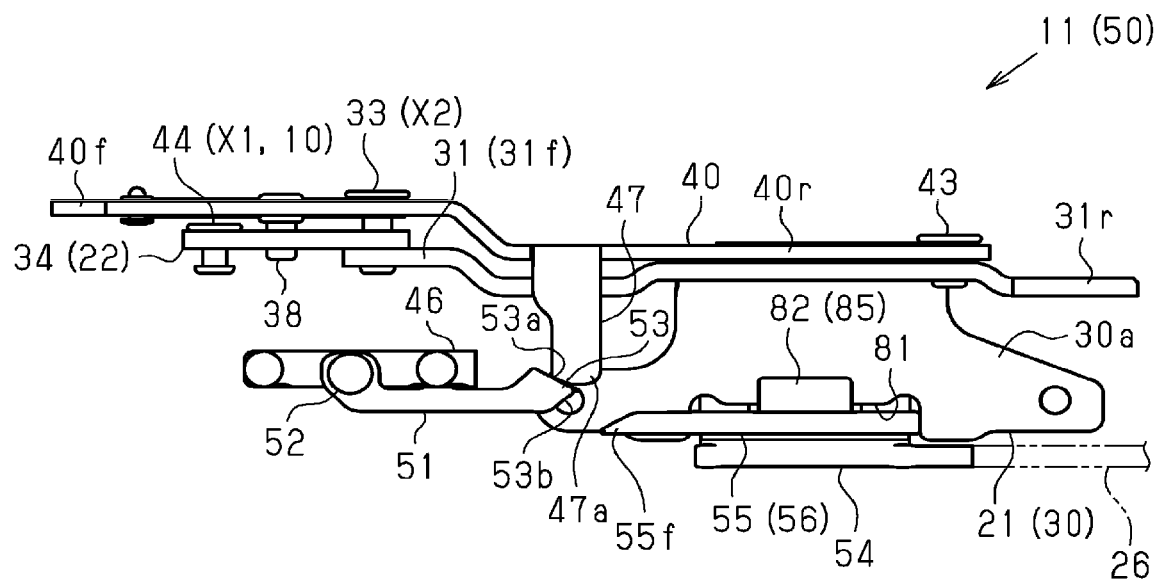
FIG. 18 is a plan view of the lift mechanism.

As shown in FIGS. 11, 12 and 18, a base end of the engagement lever 51 according to the present embodiment is rotatably and pivotally supported by a support shaft 52 erected on the front end 20f of the guide rail 20 together with the deployment stopper 46. In addition, a tip end portion of the engagement lever 51 is disposed in a state of facing a rear end 20r side of the guide rail 20, that is, the housing direction (right side in FIG. 18) of the slope plate 10. Further, the engagement lever 51 includes, at the tip end portion thereof, a hook-shaped engagement portion 53 that protrudes in a direction (upper side in FIG. 18) in which the driven member 40 is located in the width direction of the guide rail 20. Accordingly, in the engagement lever 51 according to the present embodiment, the engaging piece 47 of the driven member 40 can be sandwiched between the engagement portion 53 and the deployment stopper 46 due to the rotation of the engagement lever 51 around the support shaft 52.

Figure 19:
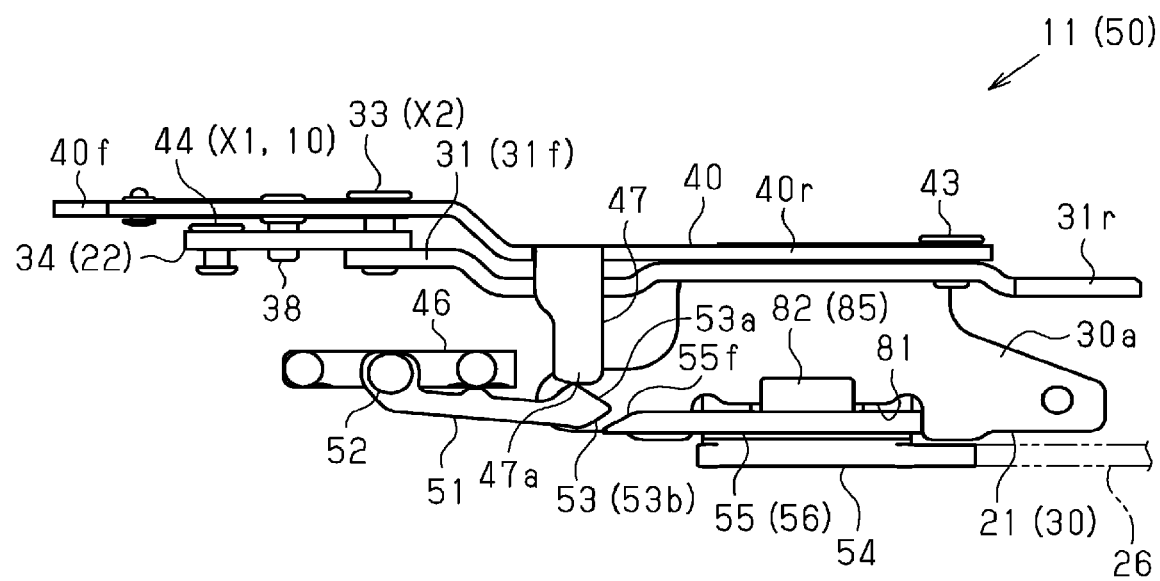
FIG. 19 is a plan view of the lift mechanism.

In detail, as shown in FIGS. 18 and 19, the slope apparatus 11 according to the present embodiment is configured such that the engaging piece 47 of the driven member 40 that is moved in the deployment direction comes in contact with the engagement portion 53 of the engagement lever 51. Specifically, in the slope apparatus 11 according to the present embodiment, the engagement portion 53 of the engagement lever 51 is provided with a first tapered surface 53a facing a direction in which the driven member 40 is located in the width direction of the guide rail 20 (the up-down direction in these figures). Further, in the slope apparatus 11 according to the present embodiment, a tip end 47a of the engaging piece 47 that protrudes above the moving member 21 from the second vertical plate portion 40r of the driven member 40 comes in contact with the first tapered surface 53a provided on the engagement portion 53 of the engagement lever 51.

Further, the engagement lever 51 according to the present embodiment rotates in a clockwise direction in these figures in a state where the engagement portion 53 is pressed back by the tip end 47a of the engaging piece 47 due to the contact. That is, in the slope apparatus 11 according to the present embodiment, at this time, the direction in which the engagement lever 51 is pressed by the engaging piece 47 of the driven member 40 and rotates is a first direction. Accordingly, in the slope apparatus 11 according to the present embodiment, the engaging piece 47 is disposed at a position where the engaging piece 47 abuts with the deployment stopper 46 by allowing the movement of the driven member 40 towards the deployment direction.

As shown in FIGS. 9 to 12 and FIGS. 18 and 19, the slope apparatus 11 according to the present embodiment includes connecting members 54 each of which is connected to the moving member 21 in a state of being fixed to the drive cable 26. That is, the connecting member 54 is moved integrally with the moving member 21 based on the driving force transmitted via the drive cable 26. In addition, the connecting member 54 is fitted into the lateral plate portion 30 of the moving member 21 at an end of the moving member 21 opposite to a position where the vertical wall portion 31 is erected. In the slope apparatus 11 according to the present embodiment, the connecting member 54 is formed using a resin. Further, the connecting member 54 includes a substantially plate-shaped vertical plate-shaped portion 55 that is erected in a state of facing the vertical wall portion 31 of the moving member 21 by the fitting into the lateral plate portion 30. Further, in the slope apparatus 11 according to the present embodiment, due to the movement of the moving member 21 and the connecting member 54 toward the deployment direction, the vertical plate-shaped portion 55 comes in contact with the engagement portion 53 of the engagement lever 51 that rotates in the first direction due to the contact with the engaging piece 47 of the driven member 40.

Figure 20:
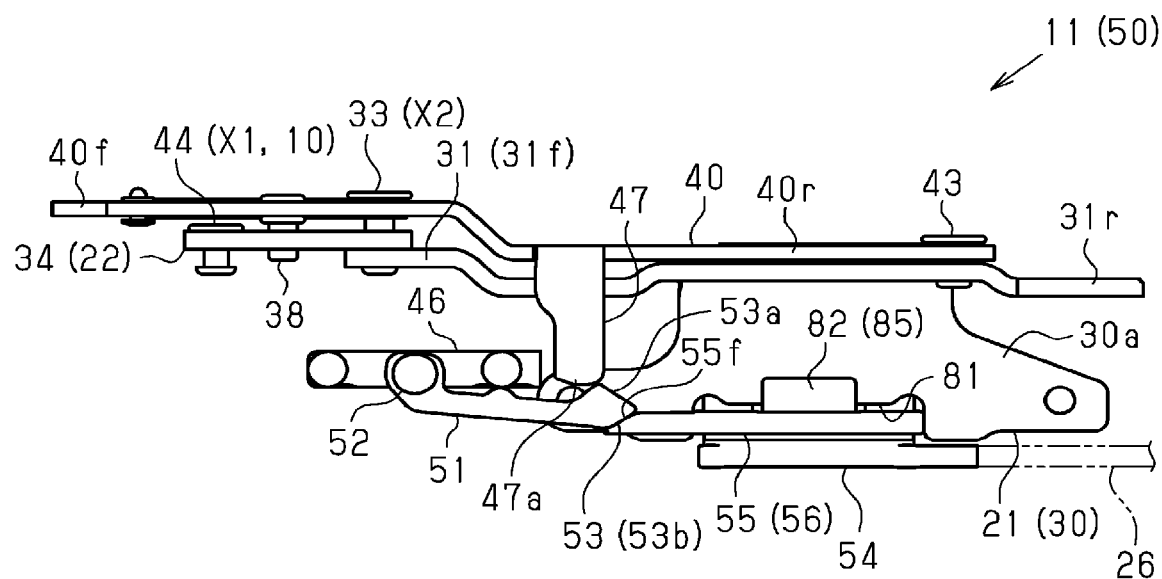
FIG. 20 is a plan view of the lift mechanism.
Figure 21:
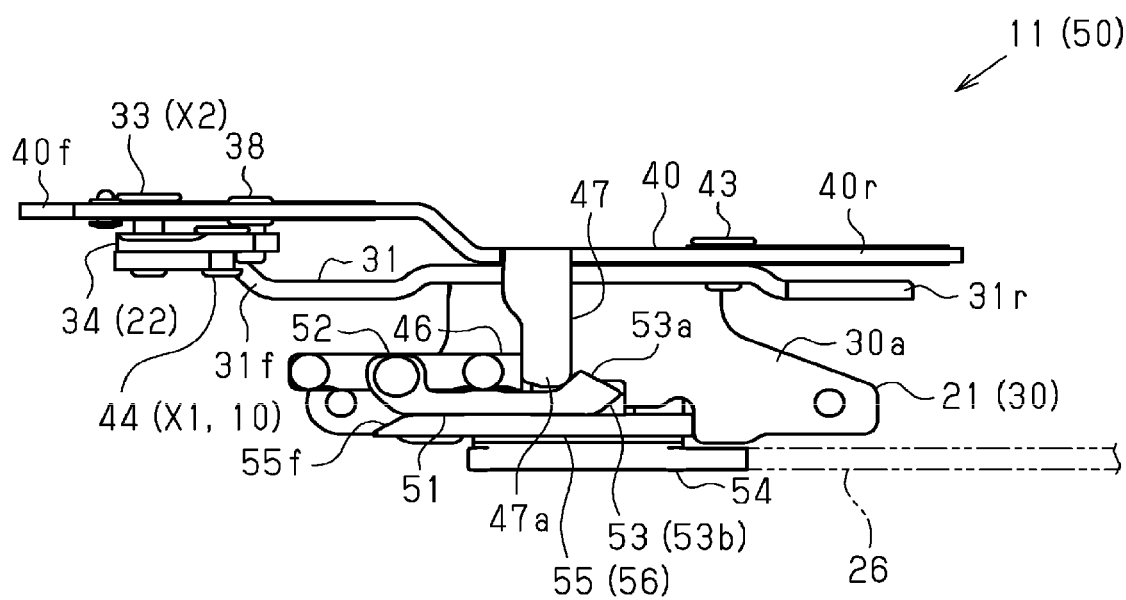
FIG. 21 is a plan view of the lift mechanism.

In detail, as shown in FIGS. 20 and 21, the engagement portion 53 of the engagement lever 51 according to the present embodiment is provided with a second tapered surface 53b facing a side opposite to the first tapered surface 53a (lower side in these figures) in the width direction of the guide rail 20. In the slope apparatus 11 according to the present embodiment, the vertical plate-shaped portion 55 of the connecting member 54 being moved in the deployment direction comes in contact with the second tapered surface 53b.

Specifically, the slope apparatus 11 according to the present embodiment is configured such that after the engaging piece 47 of the driven member 40 being moved in the deployment direction passes, a tip end portion 55f of the vertical plate-shaped portion 55 comes in contact with the second tapered surface 53b provided on the engagement portion 53 of the engagement lever 51. In addition, in the slope apparatus 11 according to the present embodiment, a tapered shape corresponding to the second tapered surface 53b is also set for the tip end portion 55f of the vertical plate-shaped portion 55. Further, the engagement lever 51 according to the present embodiment rotates in a counter-clockwise direction in these figures in a state where the engagement portion 53 is pushed back by the vertical plate-shaped portion 55 of the connecting member 54 due to the contact.

That is, in the slope apparatus 11 according to the present embodiment, the vertical plate-shaped portion 55 of the connecting member 54 constitutes a pressing portion 56 that is moved integrally with the moving member 21. Further, at this time, the direction in which the engagement lever 51 is pressed by the vertical plate-shaped portion 55 of the connecting member 54 and rotates is a second direction. Accordingly, in the slope apparatus 11 according to the present embodiment, the engagement portion 53 of the engagement lever 51 sandwiches the engaging piece 47 of the driven member 40 between the engagement portion 53 and the deployment stopper 46 in the deployment and housing directions of the slope plate 10.

In the slope apparatus 11 according to the present embodiment, the moving member 21 and the connecting member 54 are moved in the deployment direction from this state, and thus the vertical plate-shaped portion 55 of the connecting member 54 is disposed at a first direction side (the lower side in these figures) of the engagement lever 51. Further, the rotation of the engagement lever 51 in the first direction is restricted based on the disposition of the vertical plate-shaped portion 55. Accordingly, in the slope apparatus 11 according to the present embodiment, the state where the engaging piece 47 of the driven member 40 is sandwiched between the deployment stopper 46 and the engagement portion 53 of the engagement lever 51 is maintained.

That is, in the slope apparatus 11 according to the present embodiment, in the state where the slope plate 10 is deployed at the lower end of the door opening portion 3, the driven member 40 cannot be moved in either the deployment direction or the housing direction, in other words, the moving position is fixed. Accordingly, in the slope apparatus 11 according to the present embodiment, the posture of the slope plate 10 whose rear end 10r is lifted up based on the operation of the lift mechanism 50 can be stably held.

In addition, as shown in FIG. 19, during housing of the slope plate 10, the moving member 21 and the connecting member 54 are moved in the housing direction, and thus the engagement lever 51 is allowed to rotate in the first direction again. Accordingly, the driven member 40 is moved in the housing direction together with the link member 34 connected to the moving member 21 in a state where the engagement portion 53 of the engagement lever 51 is pushed back by the engaging piece 47.

Moving Posture Holding Structure of Slope Plate

Next, a moving posture holding structure of the slope plate 10 in the slope apparatus 11 according to the present embodiment will be described.

As shown in FIGS. 9, 10, 22 and 23, the slope apparatus 11 according to the present embodiment includes rollers 57 each of which is provided on the link member 34 constituting the support arm 22. In the slope apparatus 11 according to the present embodiment, the roller 57 is rotatably and pivotally supported by a support shaft 58 fixed to the link member 34. In addition, in the slope apparatus 11 according to the present embodiment, the roller 57 abuts with an upper wall surface 59 of the guide rail 20 from below during deployment and housing operations of the slope plate 10. Accordingly, in the slope apparatus 11 according to the present embodiment, the slope plate 10 is moved in the deployment and housing directions integrally with the moving members 21 and the link members 34 in a state where the rollers 57 slide on the upper wall surfaces 59 of the guide rails 20.

That is, in the slope apparatus 11 according to the present embodiment, the moving members 21 that are moved in the deployment direction along the extending direction of the guide rails 20 push the slope plate 10 connected therewith via the link members 34 out from the housing box 13, so as to deploy the slope plate 10 to the outside of the vehicle. Further, the moving members 21 that are moved in the housing direction along the extending direction of the guide rails 20 pull back the slope plate 10 connected therewith via the link members 34, so as to house the slope plate 10 into the housing box 13.

As shown in FIG. 15, in the slope apparatus 11 according to the present embodiment, at this time, the connecting shaft 38 of the driven member 40 disposed in the elongated hole 45 of the link member 34 is disposed at a front end portion of the elongated hole 45 in the longitudinal direction. Accordingly, in the slope apparatus 11 according to the present embodiment, the rotation of the link member 34 is restricted in a direction in which the rear end 10r of the slope plate 10 is pulled down.

Figure 22:
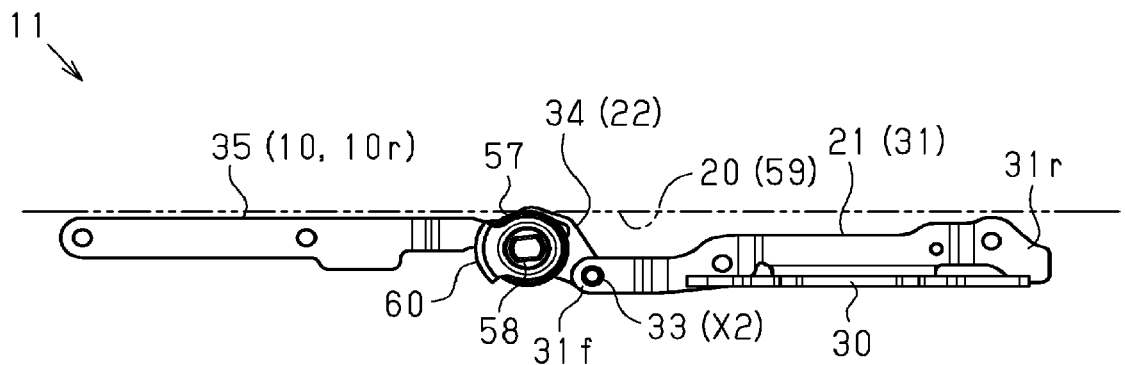
FIG. 22 is a side view of the side plate, the link member, the moving member, the roller and the roller cover.
Figure 23:
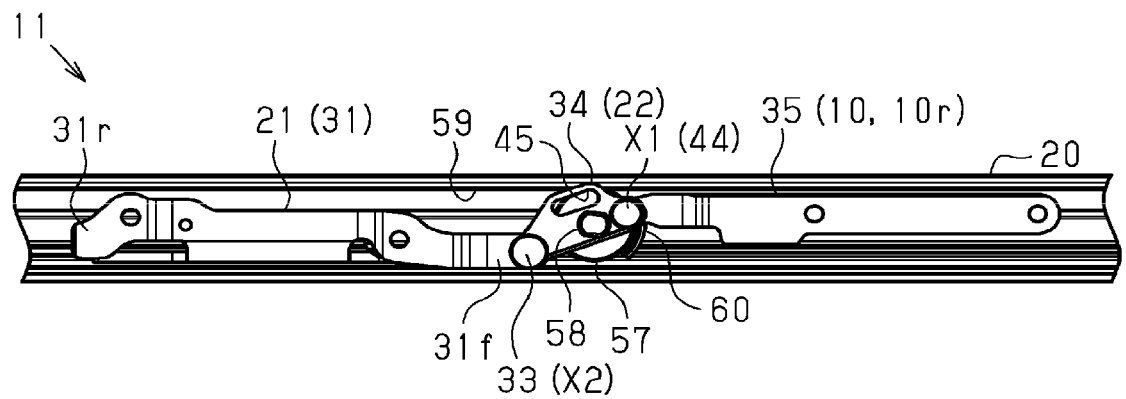
FIG. 23 is a side view of the side plate, the link member, the moving member, the roller, the roller cover, and a guide rail.
Figure 24:
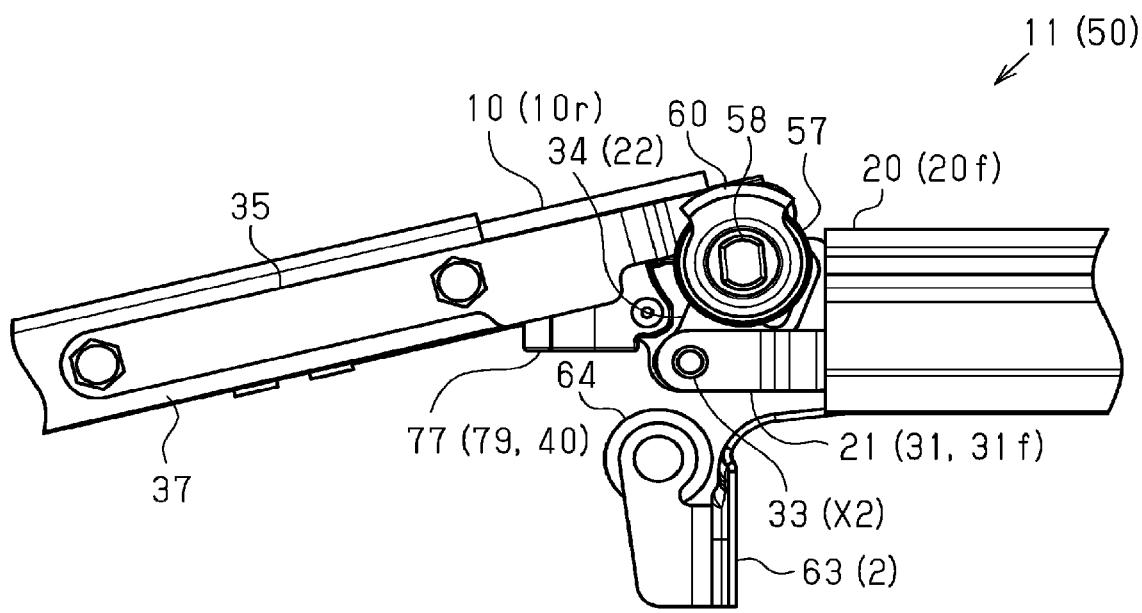
FIG. 24 is a side view in the vicinity of the roller and the roller cover in a lift-up state where a rear end of the slope plate is lifted up.
Figure 25:
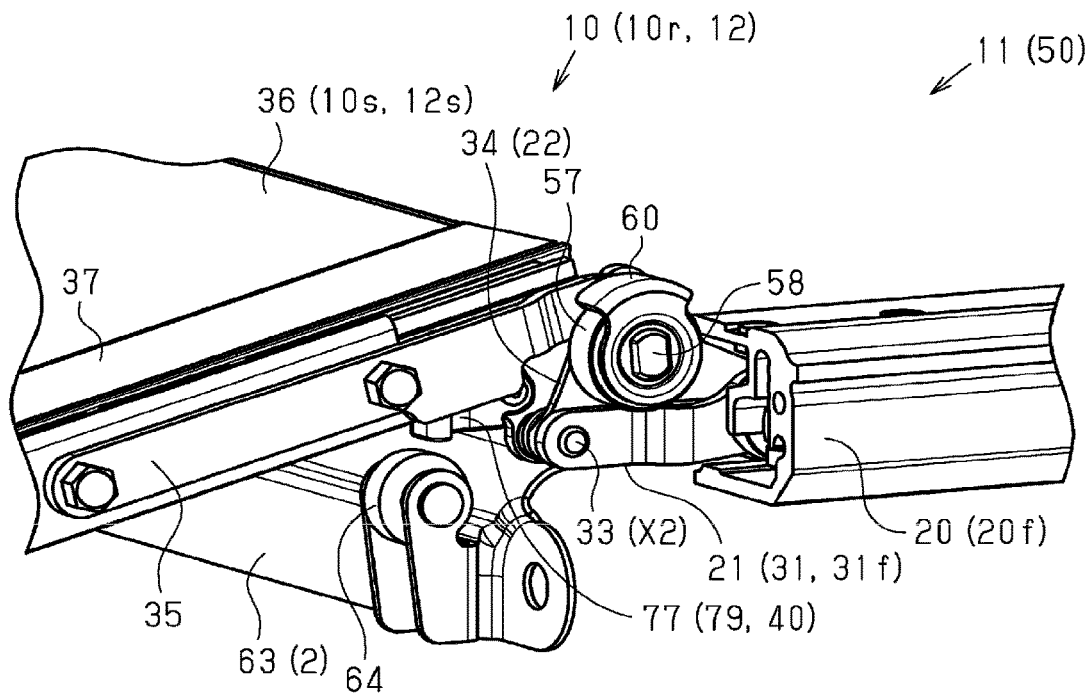
FIG. 25 is a perspective view in the vicinity of the roller and the roller cover in the lift-up state.
Figure 26A:
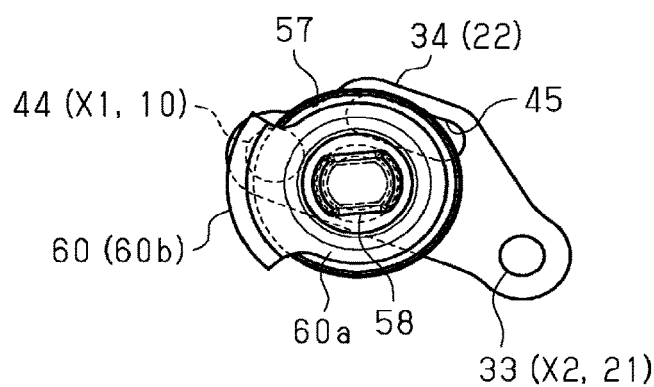
FIG. 26A and FIG. 26B are side views of the link member, the roller and the roller cover.
Figure 26B:
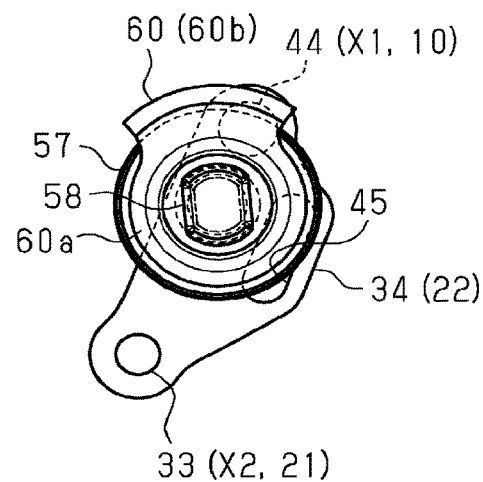
Figure 27:
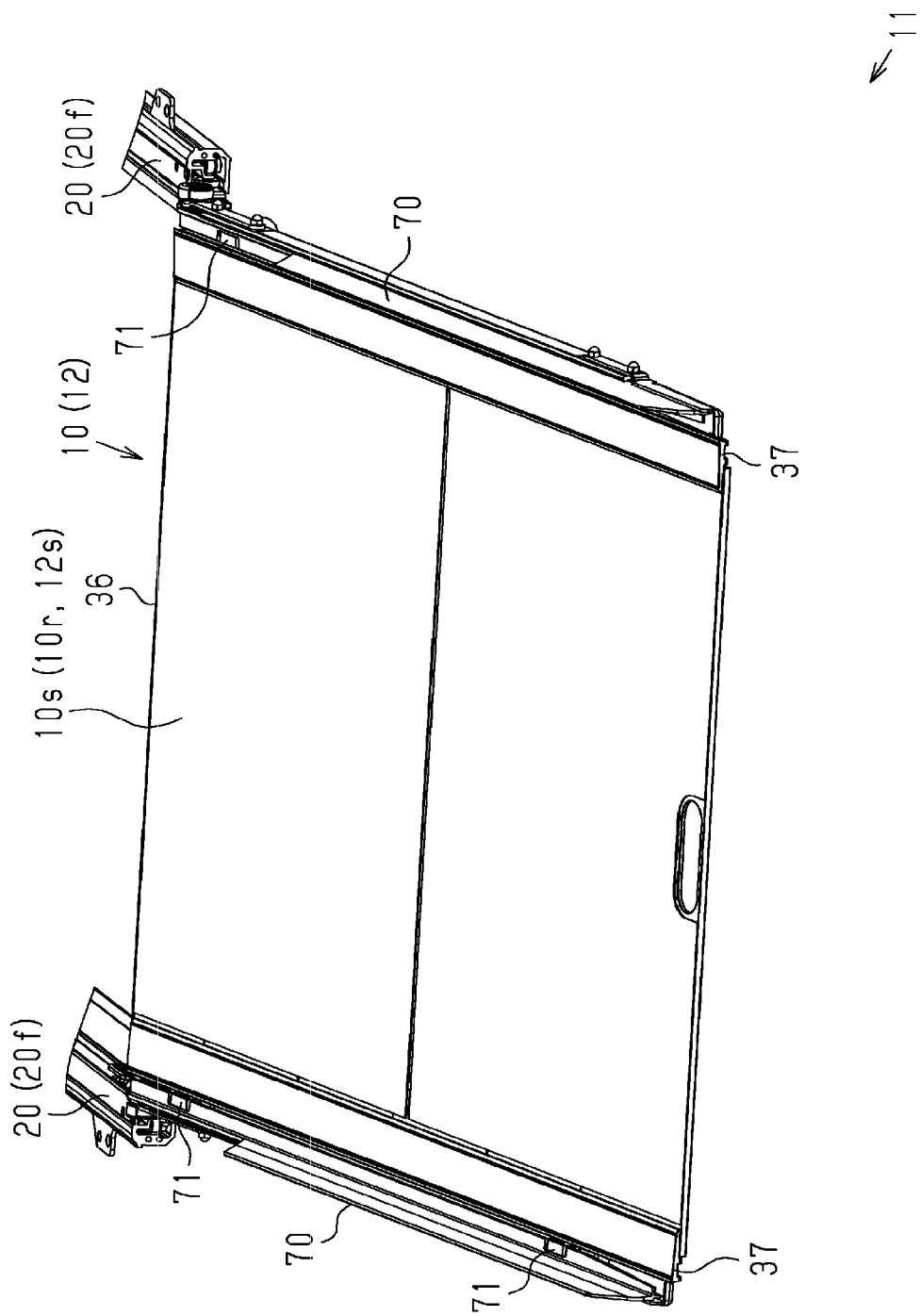
FIG. 27 is a perspective view of the slope plate in a deployed state and a falling prevention member in a standing state.
Figure 28:
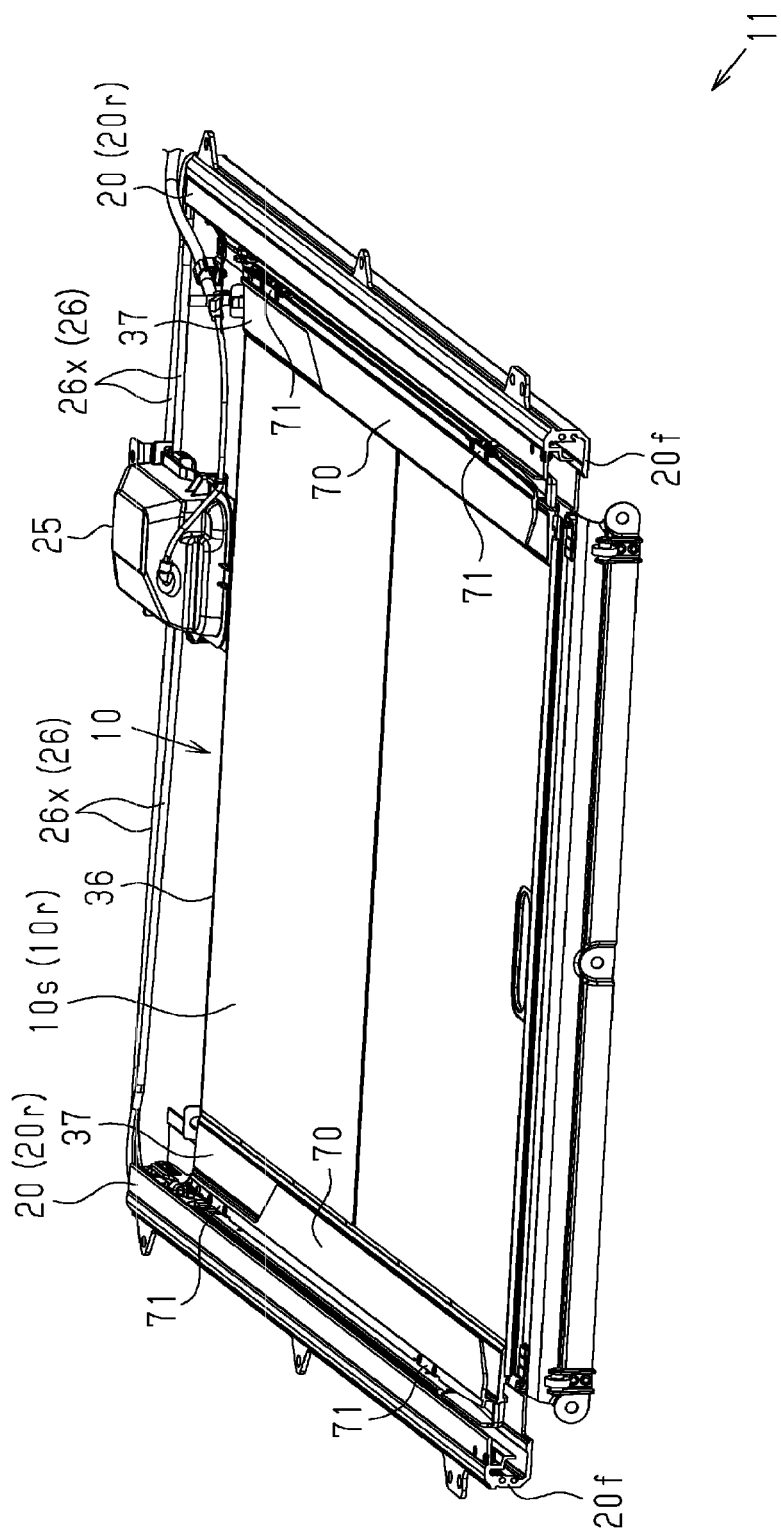
FIG. 28 is a perspective view of the slope plate in a housed state and the falling prevention member in a tilted state.

Further, as shown in FIGS. 22 and 23, the roller 57 provided on the link member 34 abuts with the upper wall surface 59 of the guide rail 20, and thereby the rotation of the link member 34 is restricted in a direction in which the rear end 10r of the slope plate 10 is lifted up. Accordingly, in the slope apparatus 11 according to the present embodiment, the moving posture of the substantially horizontal slope plate 10 can be stably held, and the rotation of the roller 57 can reduce the sliding resistance during the deployment and housing operations.

Further, as shown in FIGS. 11 to 14 and FIGS. 24 and 25, the slope apparatus 11 according to the present embodiment includes roller covers 60 each of which covers the roller 57 from above in the state where the rear end 10r of the slope plate 10 is lifted up due to the rotation of the link members 34.

Specifically, as shown in FIGS. 24, 25, 26A and 26B, the roller cover 60 according to the present embodiment includes a substantially plate-shaped fixing portion 60a fixed on the support shaft 58 of the roller 57 at a position where the roller 57 is sandwiched between the fixing portion 60a and the link member 34. Further, the roller cover 60 includes a curved plate-shaped covering member 60b that is provided to extend in an axial direction of the support shaft 58 from one end of the fixing portion 60a that covers an axial end of the roller 57, so as to be disposed at a position where the outside in a radial direction of the roller 57 is partially covered. Accordingly, the roller cover 60 according to the present embodiment rotates integrally with the link member 34 instead of rotating around the support shaft 58 of the roller 57 at the time of the rotation of the link member 34.

That is, as shown in FIGS. 9 to 14, 22 to 25, and FIGS. 26A and 26B, the roller cover 60 according to the present embodiment is disposed at a position where the covering member 60b covers a deployment direction side of the roller 57 before the rear end 10r of the slope plate 10 is lifted up, that is, in a state before lift-up. Further, due to the rotation of the link member 34 that lifts up the rear end 10r of the slope plate 10, the roller cover 60 is disposed at a position where the covering member 60b covers the roller 57 from above. Accordingly, in the slope apparatus 11 according to the present embodiment, when the slope plate 10 is deployed, the roller cover 60 together with the link member 34 constituting the support arm 22 protect the roller 57 disposed at a position where the roller 57 is exposed to the outside of the guide rail 20.

In addition, as shown in FIGS. 9 to 12, the slope apparatus 11 according to the present embodiment includes a plurality of rollers 61 provided on each of the moving members 21. That is, each of these rollers 61 also is in sliding contact with a wall surface formed by the guide rail 20. Accordingly, in the slope apparatus 11 according to the present embodiment, the sliding resistance of the moving member 21 that is moved along the extending direction of the guide rail 20 is reduced.

Further, as shown in FIGS. 11, 12, 24 and 25, the slope apparatus 11 according to the present embodiment includes a protective plate 63 fixed to the vehicle body 2 to extend in the width direction of the slope plate 10 at a position corresponding to the front end 20f of the guide rail 20. Further, the protective plate 63 is provided with a plurality of rollers 64 that are in sliding contact with a lower surface of the slope plate 10 deployed at the lower end of the door opening portion 3 to extend from the housing box 13 to the outside of the vehicle. Accordingly, in the slope apparatus 11 according to the present embodiment, the smooth deployment and housing operations of the slope plate 10 can be ensured.

Falling Prevention Member

Next, a falling prevention member provided on the slope plate 10 according to the present embodiment will be described.

As shown in FIGS. 27 to 30, the slope apparatus 11 according to the present embodiment includes a pair of left and right falling prevention members 70, 70 that are provided on the side frames 37, 37 constituting the side ends of the slope plate 10.

Specifically, in the slope apparatus 11 according to the present embodiment, each of the falling prevention members 70, 70 has a substantially plate shape extending in the longitudinal direction of the slope plate 10. The slope apparatus 11 according to the present embodiment includes a plurality of hinge portions 71 provided on the side frames 37, 37 constituting the side ends of the slope plate 10. Further, each of the side frames 37, 37 according to the present embodiment includes a pair of the hinge portions 71, 71 provided at two locations separated in a longitudinal direction of the side frames 37. Then, the falling prevention members 70, 70 according to the present embodiment are rotatably connected to the side ends of the slope plate 10 via the hinge portions 71.

That is, in the slope apparatus 11 according to the present embodiment, the falling prevention members 70, 70 stand up when the slope plate 10 deployed at the lower end of the door opening portion 3 is in a state of forming the ramp 12. Further, the falling prevention members 70, 70 can be tilted when the slope plate 10 is in the housed state, or is moved in the deployment and housing directions.

Figure 31:
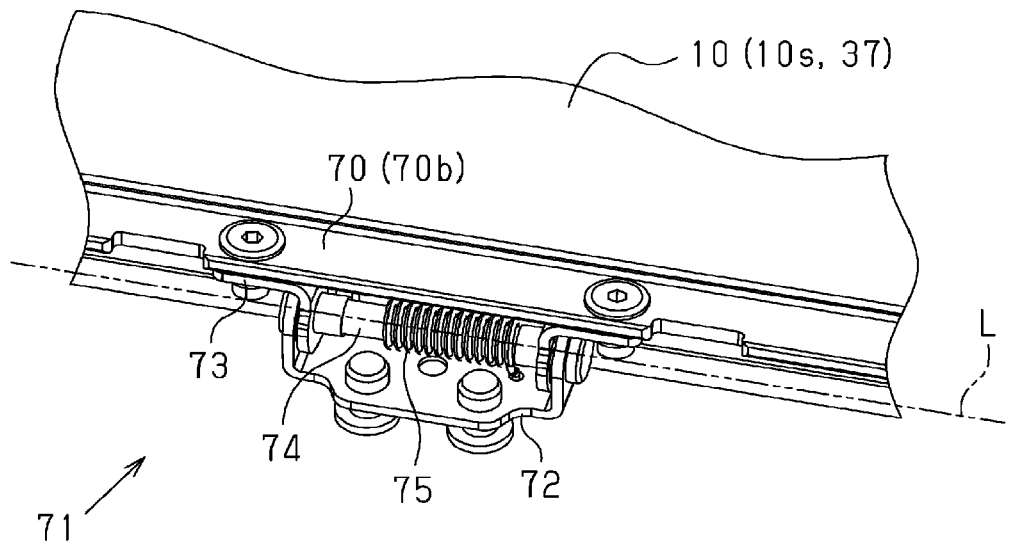
FIG. 31 is a perspective view of a hinge portion provided on the slope plate and a torsion coil spring that urges the falling prevention member connected to a side end of the slope plate via the hinge portion.
Figure 32:
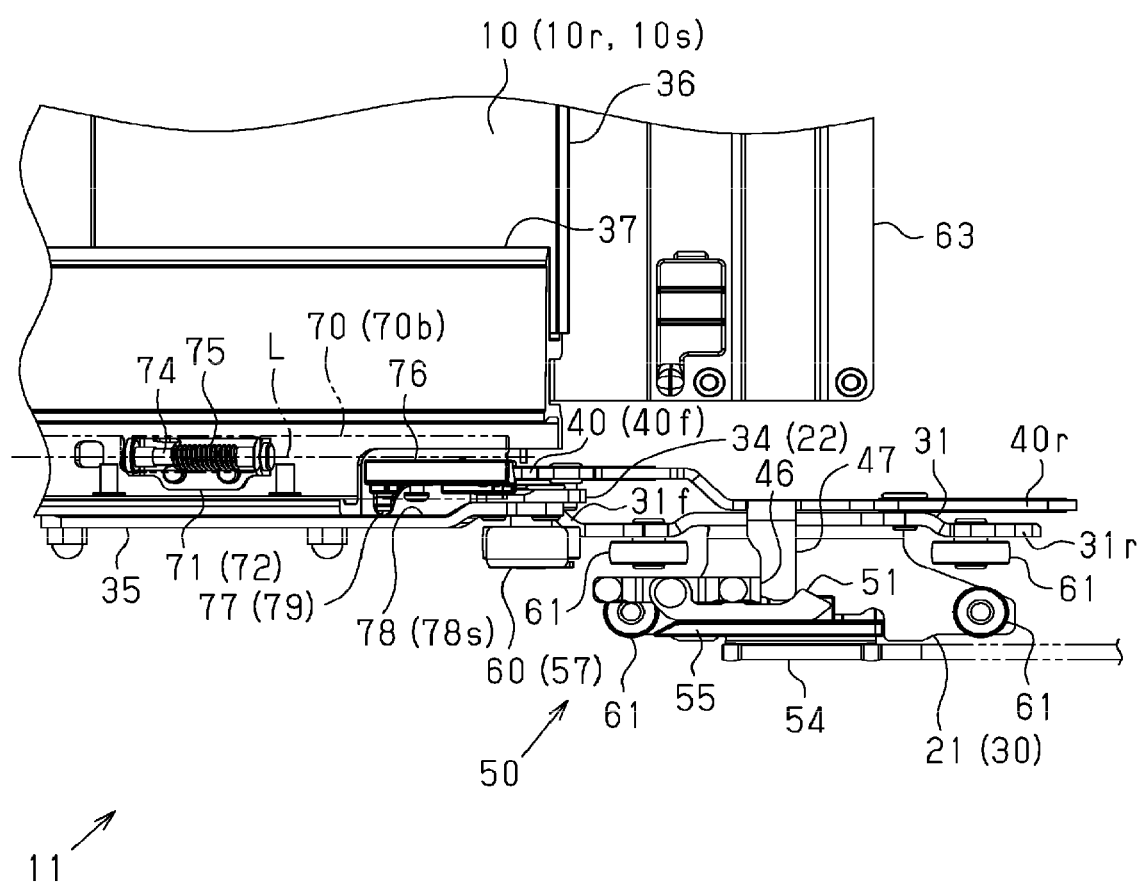
FIG. 32 is a plan view of the slope apparatus in the vicinity of the rear end of the slope plate.

In detail, as shown in FIGS. 31 and 32, the hinge portion 71 according to the present embodiment includes a fixing member 72 for the side frame 37 and a fixing member 73 for the falling prevention member 70. Further, in the slope apparatus 11 according to the present embodiment, a height of the falling prevention member 70 in the vicinity of the rear end 10r of the slope plate 10 is set low (see FIGS. 27 and 28). Further, the hinge portion 71 includes a connecting shaft 74 rotatably connected to the fixing members 72, 73. Accordingly, in the slope apparatus 11 according to the present embodiment, the falling prevention member 70 connected to the side frame 37 constituting the side end of the slope plate 10 rotates around a rotation axis L formed by the connecting shaft 74 of the hinge portion 71.

In addition, the slope apparatus 11 according to the present embodiment includes torsion coil springs 75 each of which is inserted into the connecting shaft 74 of the hinge portion 71. The falling prevention member 70 according to the present embodiment is urged by the torsion coil spring 75 so as to stand up at the side end of the slope plate 10.

Figure 29:
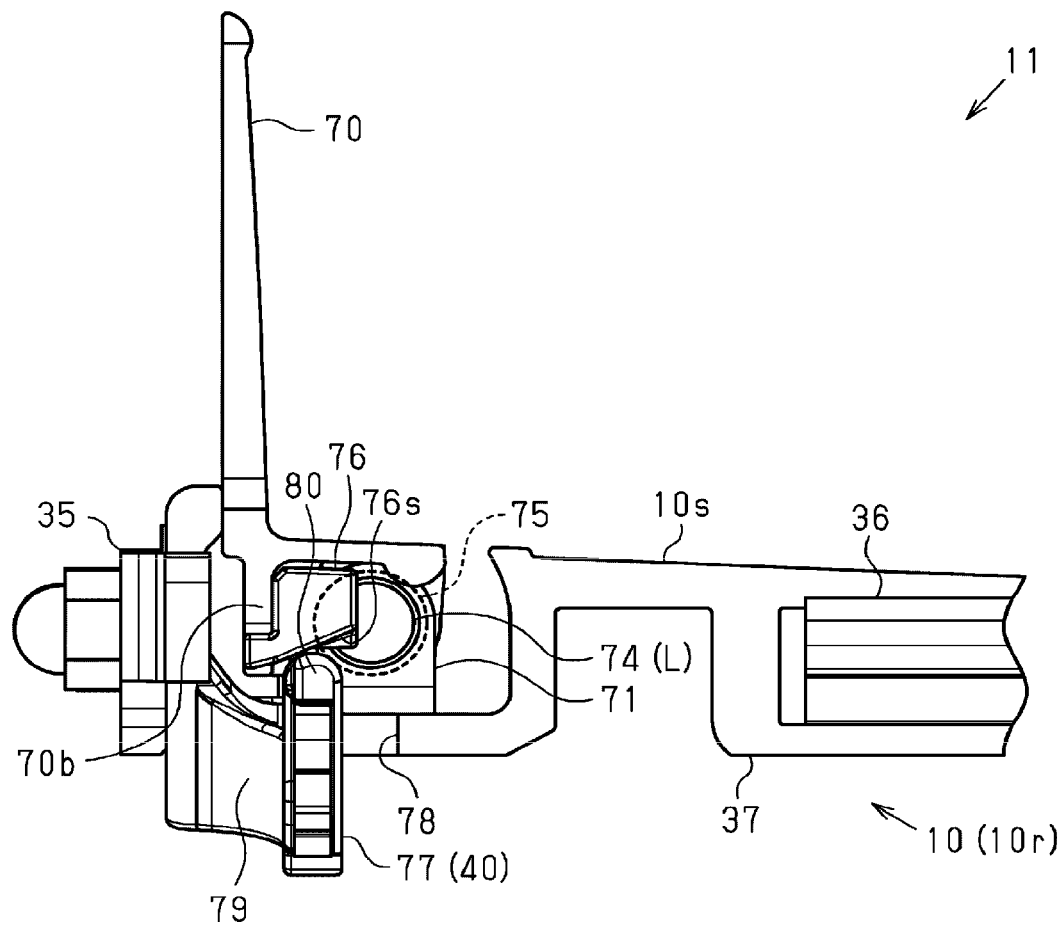
FIG. 29 is a rear view of the slope plate in the state where the falling prevention member stands up.
Figure 30:
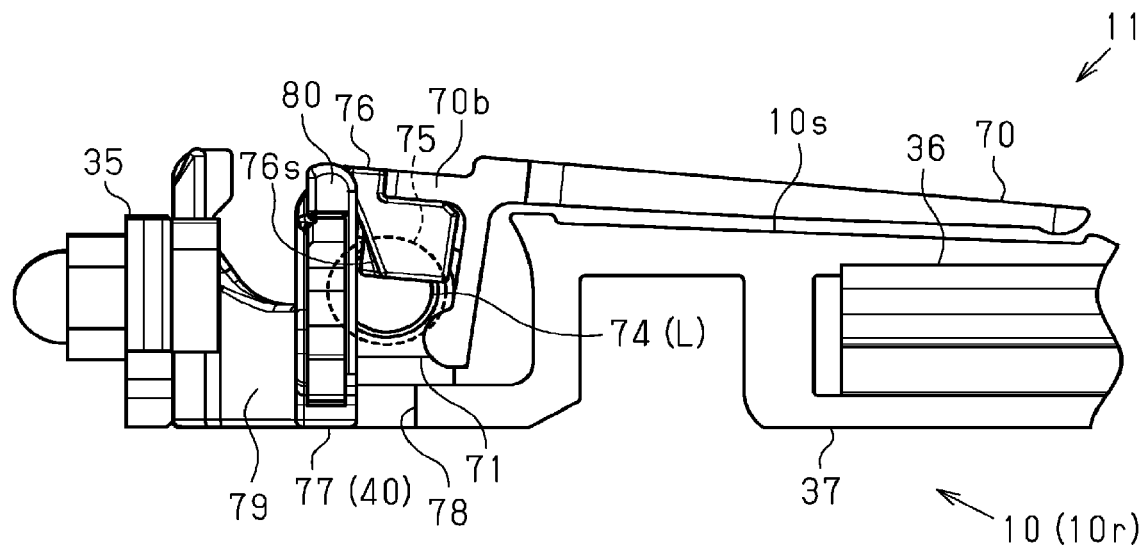
FIG. 30 is a rear view of the slope plate in the state where the falling prevention member is tilted.

Further, as shown in FIGS. 29 and 30, the slope apparatus 11 according to the present embodiment includes check blocks 76 each of which is provided on a base end portion 70b of the falling prevention member 70 at the time of the housing operation of the slope plate 10, and pressing members 77 each of which presses the check block 76. In the slope apparatus 11 according to the present embodiment, based on a pressing force of the pressing member 77, the falling prevention member 70 rotates in the clockwise direction around the connecting shaft 74 of the hinge portion 71 constituting the rotation axis L in FIGS. 29 and 30. Accordingly, in the slope apparatus 11 according to the present embodiment, the falling prevention member 70 is tilted on an upper surface 10s of the slope plate 10 against an urging force of the torsion coil spring 75.

The check block 76 according to the present embodiment has a tapered surface 76s at a position where the check block 76 is pressed by the pressing member 77. Accordingly, in the slope apparatus 11 according to the present embodiment, the falling prevention member 70 smoothly rotates in a tilting direction thereof.

Figure 33:
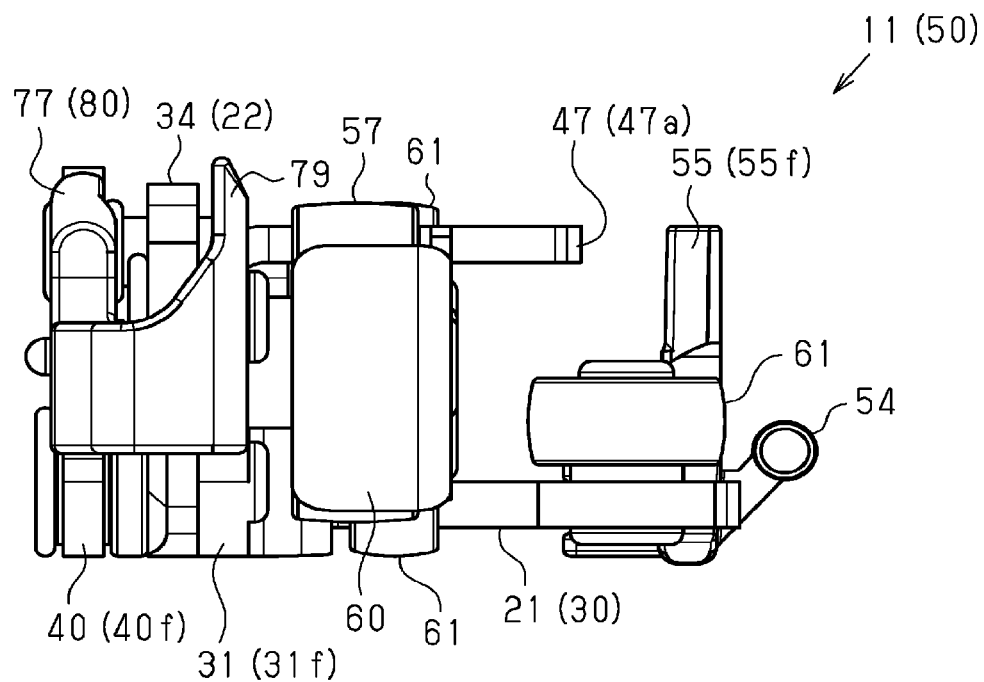
FIG. 33 is a front view of the lift mechanism.
Figure 34:
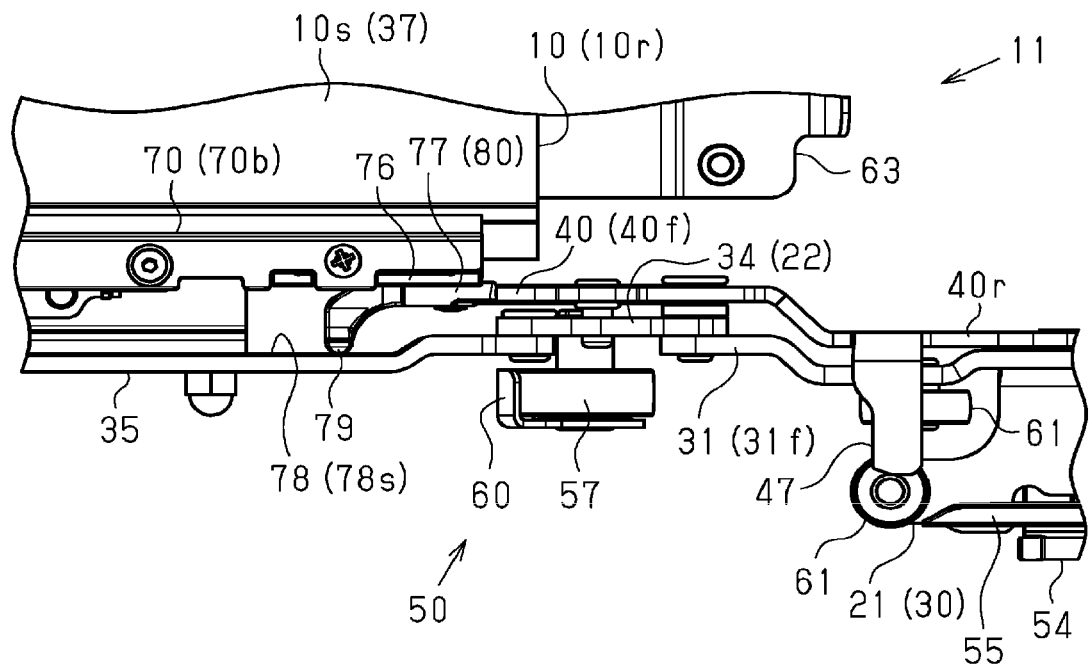
FIG. 34 is a plan view of the slope apparatus in the vicinity of a slit provided at the rear end of the slope plate.
Figure 35:
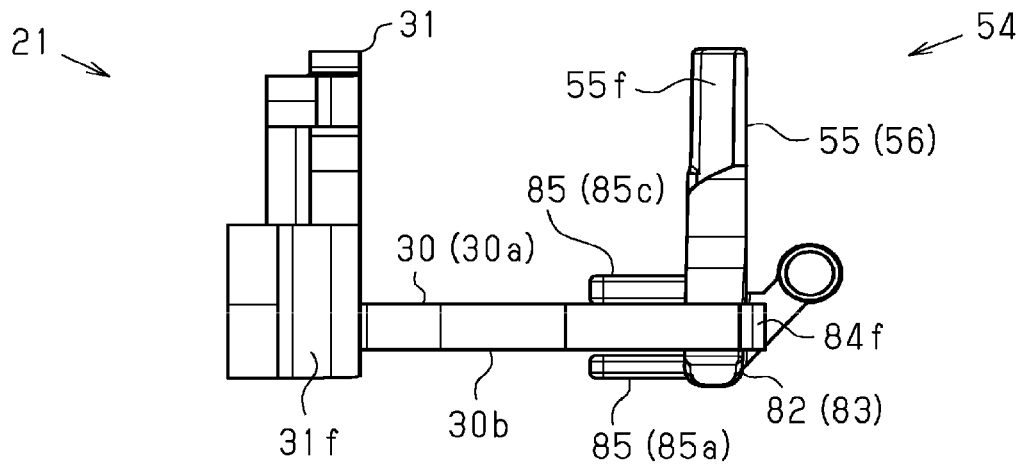
FIG. 35 is a front view of the moving member and the connecting member.
Figure 36:
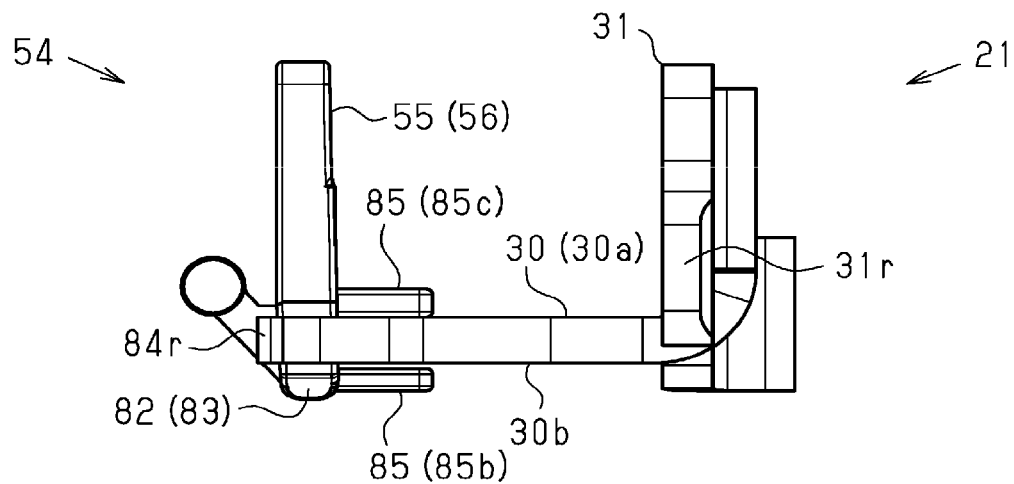
FIG. 36 is a rear view of the moving member and the connecting member.
Figure 37:
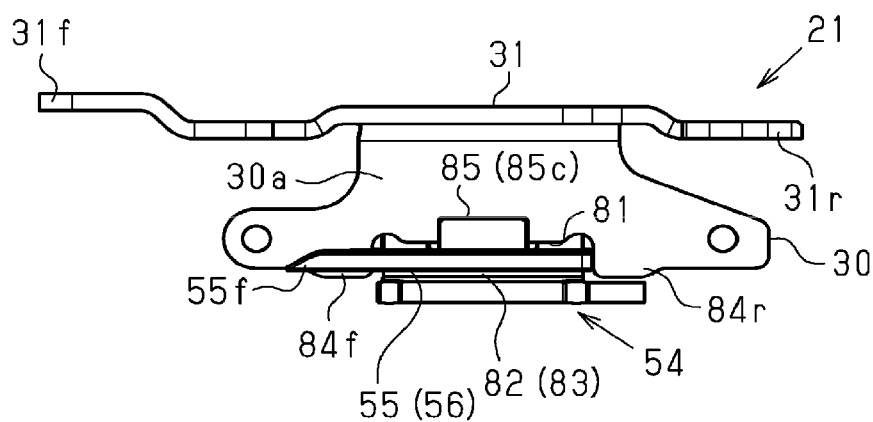
FIG. 37 is a plan view of the moving member and the connecting member.
Figure 38:
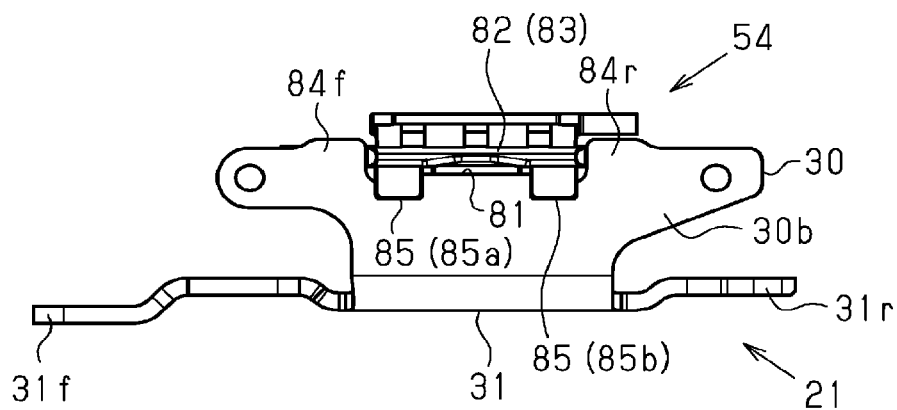
FIG. 38 is a bottom view of the moving member and the connecting member.

As shown in FIGS. 33 and 34, in the slope apparatus 11 according to the present embodiment, the pressing member 77 is fixed at a front end portion of the first vertical plate portion 40f of the driven member 40. Further, in the slope plate 10 according to the present embodiment, a slit 78 is formed between the side frame 37 and the side plate 35, in which the first rotation connecting point X1 between the slope plate 10 and the support arm 22 is formed, at the rear end 10r of the slope plate 10. In the slope apparatus 11 according to the present embodiment, the pressing member 77 provided on the driven member 40 presses the check block 76 of the falling prevention member 70 via the slit 78.

That is, at the time of the housing operation of the slope plate 10, the falling prevention members 70 also move downward together with the slope plate 10 due to the rotation of the support arms 22 that pulls down the rear end 10r of the slope plate 10. Further, in the slope apparatus 11 according to the present embodiment, at this time, the pressing member 77 provided on the driven member 40 is disposed below the check block 76 provided on the base end portion 70b of the falling prevention member 70. Accordingly, in the slope apparatus 11 according to the present embodiment, the falling prevention member 70 is tilted on the upper surface 10s of the slope plate 10 based on the housing operation of the slope plate 10.

In addition, in the slope apparatus 11 according to the present embodiment, when the slope plate 10 is moved, the driven member 40 provided with the pressing member 77 is also moved together with the slope plate 10. Accordingly, in the slope apparatus 11 according to the present embodiment, the tilted state of the falling prevention member 70 is maintained by the pressing member 77 continuously pressing the check block 76 of the falling prevention member 70.

Further, as shown in FIGS. 29 and 30, at the time of the deployment operation of the slope plate 10, the rear end 10r of the slope plate 10 is lifted up due to the rotation of the support arms 22, and thus a pressing force in a direction in which the pressing member 77 presses the check block 76 upward is weakened. Accordingly, in the slope apparatus 11 according to the present embodiment, the falling prevention member 70 stands up at the side end of the slope plate 10 when the falling prevention member 70 rotates in the counterclockwise direction in FIGS. 29 and 30 based on the urging force of the torsion coil spring 75.

Further, as shown in FIGS. 33 and 34, the pressing member 77 according to the present embodiment includes an abutting piece 79 that is curved in the width direction of the slope plate 10 and abuts with the side plate 35 constituting a sidewall surface 78s of the slit 78. Specifically, in the pressing member 77 according to the present embodiment, the abutting piece 79 is formed using a resin integrally with a pressing-up portion 80 that presses the check block 76 of the falling prevention member 70 as described above. Accordingly, the abutting piece 79 of the pressing member 77 according to the present embodiment is flexible.

In addition, as shown in FIGS. 29 and 30, the pressing member 77 according to the present embodiment maintains a state in which the abutting piece 79 abuts with the sidewall surface 78s of the slit 78 even when the rear end 10r of the slope plate 10 is lifted up. Accordingly, in the slope apparatus 11 according to the present embodiment, the pressing member 77 is positioned with respect to the check block 76 of the falling prevention member 70 facing the slit 78.

Fitting Structure of Connecting Member

Next, a fitting structure of the connecting member 54 for the moving member 21 of the slope apparatus 11 according to the present embodiment will be described.

As shown in FIGS. 13, 14, and 35 to 38, the moving member 21 according to the present embodiment includes a fitting recess 81 that is provided such that one end of the lateral plate portion 30 is cut out. Specifically, in the moving member 21 according to the present embodiment, the fitting recess 81 is provided at an end of the lateral plate portion 30 opposite to the position where the vertical wall portion 31 is erected. Further, in the slope apparatus 11 according to the present embodiment, the connecting member 54 of the drive cable 26 is fitted into the fitting recess 81.

In detail, as shown in FIGS. 35 to 38, the connecting member 54 according to the present embodiment includes the vertical plate-shaped portion 55 that has a function as the pressing portion 56 against the engaging piece 47 of the driven member 40 as described above. Further, the connecting member 54 includes a fitting portion 82 provided at a lower end of the vertical plate-shaped portion 55. In the connecting member 54 according to the present embodiment, the fitting portion 82 is fitted into the fitting recess 81, and thereby the vertical plate-shaped portion 55 is connected to the lateral plate portion 30 of the moving member 21 in an erected state where the vertical plate-shaped portion 55 faces the vertical wall portion 31 of the moving member 21.

In more detail, the fitting portion 82 according to the present embodiment includes a fitting portion body 83 which is disposed inside the fitting recess 81 so as to restrict relative movement thereof in the extending direction of the guide rail 20 (left-right direction in these figures) with respect to the lateral plate portion 30 of the moving member 21. Specifically, the fitting portion body 83 is fitted into the fitting recess 81, and thus the fitting portion body 83 is sandwiched between a front engaging piece 84f and a rear engaging piece 84r formed on the lateral plate portion 30 on both sides in the extending direction of the guide rail 20. Accordingly, in the slope apparatus 11 according to the present embodiment, based on the driving force transmitted via the drive cable 26, the connecting member 54 and the moving member 21 are moved integrally along the extending direction of the guide rail 20.

In addition, the fitting portion 82 according to the present embodiment includes a plurality of fitting pieces 85 that sandwich the lateral plate portion 30 of the moving member 21 in the up-down direction. Specifically, the fitting portion 82 according to the present embodiment includes, at two position separated in the extending direction of the guide rail 20, a pair of fitting pieces 85a, 85b which abut with the lower surface 30b of the lateral plate portion 30 and each of which has a substantially plate shape. Further, at a position between the fitting pieces 85a, 85b, the fitting portion 82 includes a fitting piece 85c that abuts with the upper surface 30a of the lateral plate portion 30 and has a substantially plate shape. Accordingly, in the slope apparatus 11 according to the present embodiment, a stable fitting state between the connecting member 54 and the moving member 21 is ensured, and the tilting of the vertical plate-shaped portion 55 is prevented.

Housing Stopper Structure

Next, a housing stopper structure of the slope apparatus 11 according to the present embodiment will be described.

Figure 39:
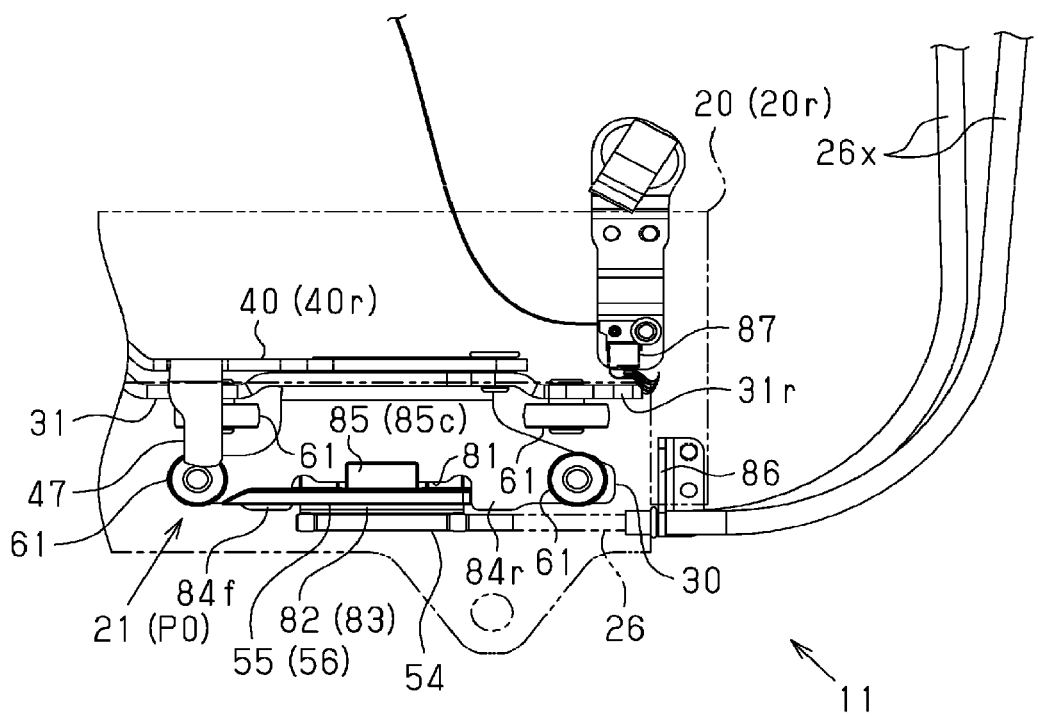
FIG. 39 is a plan view of the moving member and the connecting member moved to the vicinity of a housing position, and a housing stopper.

As shown in FIG. 39, the slope apparatus 11 according to the present embodiment includes housing stoppers 86 each of which is fixed on the rear end 20r of the guide rail 20. That is, the housing stopper 86 abuts with the moving member 21 that is moved in the housing direction (right side in FIG. 39) so as to restrict the movement of the moving member 21 toward the housing direction exceeding a predetermined housing position P0. In addition, the slope apparatus 11 according to the present embodiment includes a confirmation switch 87 provided for detecting that the moving member 21 has reached the housing position P0 by contact with the rear end 31r of the vertical wall portion 31. In the slope apparatus 11 according to the present embodiment, the housing stopper 86 is disposed at a position where the housing stopper 86 abuts with the moving member 21 in a state where the housing stopper 86 and the fitting portion 82 of the connecting member 54 for the moving member 21 are disposed adjacently in the moving direction of the moving member 21.

Specifically, the housing stopper 86 according to the present embodiment is disposed, when the moving member 21 abuts with the housing stopper 86, at a position where the rear engaging piece 84r provided on the lateral plate portion 30 of the moving member 21 is sandwiched between the housing stopper 86 and the fitting portion 82 of the connecting member 54. That is, the moving member 21 is moved integrally with the connecting member 54 based on the driving force transmitted via the drive cable 26. Therefore, as described above, since the fitting portion 82 of the connecting member 54 for the moving member 21 and the housing stopper 86 are disposed adjacently in the moving direction of the moving member 21, the housing stopper 86 can efficiently receive a load of the moving member 21. Accordingly, in the slope apparatus 11 according to the present embodiment, the posture of the moving member 21 abutting with the housing stopper 86 can be stably held.

Next, operations of the present embodiment will be described.

In the slope apparatus 11 according to the present embodiment, at the time of the deployment and housing operations of the slope plate 10, the roller 57 provided on the link member 34 constituting the support arms 22 abuts with the upper wall surface 59 of the guide rail 20 from below. Accordingly, the rotation of the link member 34 in the direction in which the rear end 10r of the slope plate 10 is lifted up is restricted, and thus the moving posture of the slope plate 10 is stably held.

Next, effects of the present embodiment will be described.

(1) The slope apparatus 11 includes the slope plate 10 deployed at the lower end of the door opening portion 3 and the guide rails 20 extending in the deployment and housing directions of the slope plate 10. In addition, the slope apparatus 11 includes the moving members 21 that are moved in the extending direction of the guide rails 20, and the support arms 22 that are rotatably connected to the rear end 10r of the slope plate 10 and are rotatably connected to the moving members 21. Further, the slope apparatus 11 includes the lift mechanism 50 that lifts up the rear end 10r of the slope plate 10 by rotating the support arms 22 in the state where the slope plate 10 is deployed. The support arms 22 are provided with the rollers 57 that hold the moving posture of the slope plate 10 by being in sliding contact with the guide rails 20 in the state where the slope plate 10 is moved integrally with the moving members 21.

According to the above configuration, the moving posture of the slope plate 10 can be stably held while preventing the increase in the sliding resistance. Accordingly, a smooth operation and high reliability can be ensured.

(2) The slope apparatus 11 includes the roller covers 60 each of which covers the roller 57 from above in the state where the rear end 10r of the slope plate 10 is lifted up due to the rotation of the support arms 22.

That is, the support arms 22 vertically move the rear end 10r of the slope plate 10 by rotating in the state of being exposed to the outside of the guide rails 20. Therefore, the rollers 57 provided on the support arms 22 are also disposed at positions where an external force is likely to be applied, for example, a user of the slope plate 10 may step on the rollers 57 by mistake. However, according to the above configuration, the rollers 57 can be protected by the roller covers 60. Accordingly, the high reliability can be ensured.

(3) The roller cover 60 is provided on the support arm 22. Further, the roller cover 60 rotates integrally with the support arm 22 so as to be disposed at a position where the roller cover 60 covers the roller 57 from above.

That is, since the roller cover 60 is provided on the support arm 22, the roller cover 60 can be housed integrally with the support arm 22. Accordingly, it is possible to simplify the configuration and reduce the size of the vehicle slope apparatus. Further, a direction in which the roller cover 60 covers the roller 57 can be changed by rotating the roller cover 60 integrally with the support arm 22. Accordingly, when the support arm 22 is moved in the deployment and housing directions, a region where the roller 57 is in sliding contact with the guide rail 20 can be secured.

(4) The lift mechanism 50 includes the driven member 40 that has the connecting shaft 38 for the link member 34 constituting the support arm 22 and is moved in the extending direction of the guide rail 20 integrally with the link member 34. Further, the lift mechanism 50 includes the deployment stoppers 46 each of which abuts with the driven member 40 moving toward the deployment direction and restricts the movement of the driven member 40. In addition, the moving member 21 is moved in the deployment direction in the state where the movement of the driven member 40 toward the deployment direction is restricted, thus the link member 34 rotates around the connecting shaft 38 with the driven member 40, and the lift mechanism 50 lifts up the rear end 10r of the slope plate 10. Further, the lift mechanism 50 includes the engagement levers 51 each of which is engaged with the driven member 40 in the state where the driven member 40 abuts with the deployment stopper 46 so as to restrict the movement of the driven member 40 toward the housing direction. When the driven member 40 is moved to the position where the driven member 40 abuts with the deployment stopper 46, the engagement lever 51 is pressed by the driven member 40 and rotates in the first direction, and thereby the movement of the driven member 40 toward the deployment direction is allowed. Further, the engagement lever 51 is engaged with the driven member 40 by being pressed with the pressing portion 56, which is provided integrally with the moving members 21 that are moved in the deployment direction in the state where the driven member 40 abuts with the deployment stopper 46, and rotating in the second direction. In this state, the rotation of the engagement lever 51 in the first direction is restricted by the pressing portion 56 located in the first direction.

According to the above configuration, the link member 34 constituting the support arm 22 rotates in conjunction with the moving member 21 that is moved in the deployment and housing directions along the guide rail 20. Accordingly, it is possible to vertically move the rear end 10r of the slope plate 10 connected to the link member 34.

Further, the moving position of the driven member 40 can be fixed in the lift-up state where the rear end 10r of the slope plate 10 is lifted up. Accordingly, the lift-up state can be stably maintained. In addition, the engagement lever 51 can be engaged or disengaged with the driven member 40 in conjunction with the moving member 21 that is moved in the deployment and housing directions. Accordingly, it is possible to simplify the configuration.

(5) The driven member 40 includes the engaging piece 47 that abuts with the deployment stopper 46 and is engaged with the engagement lever 51 in the state of being sandwiched between the deployment stopper 46 and the engagement lever 51. Accordingly, the movement of the driven member 40 in both the deployment and housing directions can be stably restricted by a simple configuration.

(6) The driven member 40 has the folded plate shape and includes the first vertical plate portion 40f and the second vertical plate portion 40r disposed at positions displaced in the width direction of the guide rails 20.

According to the above configuration, the driven member 40 that is moved in the deployment and housing directions together with the moving members 21 and the support arms 22 can be formed in an easy and space-saving manner by a simple configuration. Further, the tilting of the driven member 40 can be prevented based on the folded plate shape. Accordingly, a stable operation can be ensured.

(7) The slope apparatus 11 includes the falling prevention members 70 that are rotatably connected to the slope plate 10, and the torsion coil springs 75 each serving as the urging member that urges the falling prevention member 70 to stand up at the side end of the slope plate 10. In addition, the slope apparatus 11 includes the pressing members 77 each of which tilts the falling prevention member 70 on the upper surface 10s of the slope plate 10 against the urging force of the torsion coil springs 75 by pressing the falling prevention member 70. The pressing member 77 is inserted into the slit 78 formed in the slope plate 10 due to the rotation of the support arms 22 that pull down the rear end 10r of the slope plate 10, and thereby the pressing member 77 presses the falling prevention member 70 that is moved downward together with the slope plate 10. In addition, the pressing member 77 is disposed at a position where the pressing member 77 can abut with and press the falling prevention member 70 by being provided on the driven member 40. The pressing member 77 further includes the flexible abutting piece 79 that is curved in the width direction of the slope plate 10 and abuts with the sidewall surface 78s of the slit 78.

That is, the movement of the driven member 40 is restricted in the state where the support arms 22 connected to the rear end 10r of the slope plate 10 rotate. Therefore, by providing the pressing member 77 on the driven member 40, the falling prevention member 70 can stably stand up at the side end of the slope plate 10 in conjunction with the vertical movement of the slope plate 10 due to the rotation of the support arms 22, and can be tilted on the upper surface 10s of the slope plate 10. Further, since the abutting piece 79 of the pressing member 77 abuts with the sidewall surface 78s of the slit 78, the pressing member 77 can be positioned with respect to the falling prevention member 70 facing the slit 78. A positional deviation caused by a displacement in the width direction of the slope plate 10 can be restricted by an elastic force based on the flexibility applied to the abutting piece 79.

(8) The slope apparatus 11 includes the connecting members 54 each of which is connected to the moving member 21 in a state of being fixed to the drive cable 26, so as to be moved integrally with the moving member 21 based on the driving force transmitted via the drive cable 26. Further, the moving member 21 has the folded plate shape and includes the lateral plate portion 30 to which the connecting member 54 is connected and the vertical wall portion 31 to which the support arm 22 is connected. The connecting member 54 includes the vertical plate-shaped portion 55 that constitutes the pressing portion 56 for the engagement lever 51, and the fitting portion 82 for the lateral plate portion 30 of the moving member 21 at the lower end of the vertical plate-shaped portion 55. In addition, the fitting portion 82 includes a plurality of fitting pieces 85 that sandwich the lateral plate portion 30 of the moving member 21 in the up-down direction.

That is, by providing the pressing portion 56 for the engagement lever 51 on the connecting member 54 that is moved integrally with the moving member 21, it is possible to accurately control the engagement and disengagement of the engagement lever 51 with the driven member 40 in conjunction with the moving member 21 that is moved in the deployment and housing directions. Accordingly, a stable operation can be ensured.

In addition, an assembly operation can be facilitated by adopting a configuration in which the moving members 21 is connected to the connecting member 54 by fitting. The lateral plate portion 30 of the moving member 21 is sandwiched in the up-down direction by the plurality of fitting pieces 85, and thus tilting of the vertical plate-shaped portion 55 provided on the connecting member 54 can be prevented. Accordingly, an increase in the sliding resistance due to a change in moving postures of the connecting member 54 and the moving member 21 can be avoided.

(9) The slope apparatus 11 includes the housing stopper 86 that abuts with the moving member 21 being moved in the housing direction so as to restrict the movement of the moving member 21 toward the housing direction exceeding the predetermined housing position P0. Further, the housing stopper 86 is disposed at the position where the housing stopper 86 abuts with the moving member 21 in the state where the housing stopper 86 and the fitting portion 82 of the connecting member 54 are disposed adjacently in the deployment and housing directions.

That is, the moving member 21 is moved integrally with the connecting member 54 based on the driving force transmitted via the drive cable 26. Therefore, the housing stopper 86 can efficiently receive the load of the moving member 21 by adopting the above configuration. Accordingly, the posture of the moving members 21 abutted with the housing stopper 86 can be stably held. As a result, it is possible to eliminate a setting of an excessive strength margin and reduce a weight of the moving member 21.

The above embodiment can be modified and implemented as follows. The above embodiment and the following modifications can be implemented in combination with each other within a technically consistent range.

In the above embodiment, the roller cover 60 is fixed on the support shaft 58 of the roller 57, but the fixing position of the roller cover 60 with respect to the support arm 22 may be changed optionally. Further, the shape of the roller cover 60 also may be changed optionally.

The roller cover 60 may be disposed at a portion other than the support arm 22 as long as the roller 57 can be covered from above in the state where the rear end 10r of the slope plate 10 is lifted due to the rotation of the support arms 22. For example, the roller cover 60 may be provided to extend from the front end 20f of the guide rail 20. In addition, the roller cover 60 may be movable.

A shape, material, support structure and the like of the deployment stopper 46 may be changed optionally. Further, similarly, the configuration of the housing stopper 86 may be changed optionally.

The shapes and materials of the engaging piece 47 and the engagement lever 51 also may be changed optionally. Further, the shape of the driven member 40 also may be changed optionally. For example, an abutment position with respect to the deployment stopper 46 and an engagement position of the engagement lever 51 do not necessarily have to be the engaging piece 47. In addition, the configuration of the pressing portion 56 with respect to the engagement lever 51 provided on the moving members 21 also may be changed optionally.

In the above embodiment, the falling prevention member 70 is urged based on the elastic force of the torsion coil spring 75. However, the present disclosure is not limited thereto, and for example, the configuration of the urging member may be changed optionally, for example, by using a compression spring, a leaf spring, or another elastic member.

In addition, in the above embodiment, the end in the width direction of the slope plate 10 at the rear end 10r, that is, the side end is formed by the side plate 35 and the side frame 37. The side plate 35 forms the slit 78 with the side frame 37, and constitutes the sidewall surface 78s of the slit 78. However, the disclosure is not limited thereto, and the side end of the slope plate 10 may be any configuration. Further, the slit 78 and a constituent member of the sidewall surface 78s also may be changed optionally. Further, the direction in which the abutting piece 79 of the pressing member 77 abuts against the sidewall surface 78s of the slit 78 also may be changed optionally.

The configuration of the lift mechanism 50 may be changed optionally. The lift mechanism 50 do not necessarily have to be in conjunction with the moving members 21 that are moved in the deployment and housing directions, for example, the lift mechanism 50 may have an independent drive source. Further, a configuration in which the slope plate 10 is moved in the deployment and housing directions by a drive source other than the motor 24 may be applied.

According to an aspect of this disclosure, a vehicle slope apparatus includes: a slope plate configured to be deployed at a lower end of a door opening portion; a guide rail extending in deployment and housing directions of the slope plate; a moving member configured to move along an extending direction of the guide rail; a support arm rotatably connected to a rear end of the slope plate and rotatably connected to the moving member; and a lift mechanism configured to lift the rear end of the slope plate by rotating the support arm in a state where the slope plate is deployed. The support arm is provided with a roller configured to hold a moving posture of the slope plate by being in sliding contact with the guide rail in a state where the slope plate is moved integrally with the moving member.

According to the above configuration, an increase in the sliding resistance can be prevented, and the moving posture of the slope plate can be stably held. Accordingly, a smooth operation and high reliability can be ensured.

The vehicle slope apparatus according to the above aspect preferably includes a roller cover configured to cover the roller from above in a state where the rear end of the slope plate is lifted up due to the rotation of the support arm.

That is, the support arm vertically moves the rear end of the slope plate by rotating in a state of being exposed to the outside of the guide rail. Therefore, the roller provided on the support arm is also disposed at a position where an external force is likely to be applied, for example, a user of the slope plate may step on the roller by mistake. However, according to the above configuration, the roller can be protected by the roller cover. Accordingly, the high reliability can be ensured.

In the vehicle slope apparatus according to the above aspect, it is preferable that the roller cover is provided on the support arm and rotates integrally with the support arm so as to be disposed at a position where the roller cover covers the roller from above.

That is, the roller cover can be housed integrally with the support arm by being provided on the support arm. Accordingly, it is possible to simplify the configuration and reduce the size of the vehicle slope apparatus. Further, a direction in which the roller cover covers the roller can be changed by rotating the roller cover integrally with the support arm. Accordingly, when the support arm is moved in deployment and housing directions, a region where the roller is in sliding contact with the guide rail can be ensured.

In the vehicle slope apparatus according to the above aspect, it is preferable that the lift mechanism includes: a driven member having a connecting shaft for the support arm and configured to be moved together with the support arm in the extending direction of the guide rail, and a deployment stopper configured to abut with the driven member moving toward the deployment direction so as to restrict movement of the driven member. It is preferable that the vehicle slope apparatus further includes an engagement lever configured, when the moving member is moved in the deployment direction in a state where the movement of the driven member toward the deployment direction is restricted, and thus the support arm rotates around the connecting shaft of the driven member to lift up the rear end of the slope plate, to be engaged with the driven member, in a state where the driven member abuts with the deployment stopper, so as to restrict the movement of the driven member toward the housing direction. It is preferable that, when the driven member moves to a position where the driven member abuts with the deployment stopper, the engagement lever is pressed by the driven member and rotates in a first direction so as to allow the movement of the driven member toward the deployment direction, and the engagement lever is pressed by a pressing portion, provided integrally with the moving member that is moved in the deployment direction in a state where the driven member abuts with the deployment stopper, and rotates in a second direction so as to be engaged with the driven member, and rotation of the engagement lever in the first direction is restricted by the pressing portion located in the first direction.

According to the above configuration, the support arm rotates in conjunction with the moving member that is moved in the deployment and housing directions along the guide rail. Accordingly, it is possible to vertically move the rear end of the slope plate connected to the support arm.

Further, a moving position of the driven member can be fixed in a lift-up state where the rear end of the slope plate is lifted up. Accordingly, the lift-up state can be stably maintained. In addition, the engagement lever can be engaged or disengaged with the driven member in conjunction with the moving member being moved in the deployment and housing directions. Accordingly, it is possible to simplify the configuration.

In the vehicle slope apparatus according to the above aspect, the driven member preferably includes an engaging piece configured to abut with the deployment stopper and be engaged with the engagement lever in a state of being sandwiched between the deployment stopper and the engagement lever.

According to the above configuration, the movement of the driven member in both the deployment and housing directions can be stably restricted by a simple configuration.

In the vehicle slope apparatus according to the above aspect, the driven member preferably has a folded plate shape and includes a first vertical plate portion and a second vertical plate portion disposed at positions displaced in a width direction of the guide rail.

According to the above configuration, the driven member that is moved in the deployment and housing directions together with the moving member and the support arm can be easily formed in an easy and space-saving manner by a simple configuration. Further, tilting of the driven member can be prevented based on the folded plate shape. Accordingly, a stable operation can be ensured.

The vehicle slope apparatus according to the above aspect preferably includes: a falling prevention member rotatably connected to the slope plate; an urging member configured to urge the falling prevention member to stand up at a side end of the slope plate; and a pressing member configured to abut with the falling prevention member and press the falling prevention member so as to cause the falling prevention member to be tilted on an upper surface of the slope plate against an urging force of the urging member, the falling prevention member being moved downward together with the slope plate due to the rotation of the support arm that pulls down the lifted rear end of the slope plate. It is preferable that pressing member is provided on the driven member and is disposed at a position where the pressing member abuts with the falling prevention member by being inserted into a slit formed at the side end of the slope plate, and the pressing member includes a flexible abutting piece curved in a width direction of the slope plate and configured to abut with a sidewall surface of the slit.

That is, the moving position of the driven member is fixed in a state where the support arm connected to the rear end of the slope plate rotates. Therefore, by providing the pressing member on the driven member, the falling prevention member can stably stands up at the side end of the slope plate in conjunction with the vertical movement of the slope plate due to the rotation of the support arm, and can be tilted on the upper surface of the slope plate. Further, the pressing member can be positioned with respect to the falling prevention member facing the slit since the abutting piece of the pressing member abuts with the sidewall surface of the slit. A positional deviation caused by a displacement in the width direction of the slope plate can be restricted by an elastic force based on the flexibility applied to the abutting piece.

The vehicle slope apparatus according to the above aspect preferably includes a connecting member connected to the moving member in a state of being fixed to a drive cable so as to be moved integrally with the moving member based on a driving force transmitted via the drive cable. It is preferable that the moving member has a folded plate shape and includes a lateral plate portion to which the connecting member is connected and a vertical wall portion to which the support arm is connected, and the connecting member is connected to the moving member and includes a vertical plate-shaped portion constituting the pressing portion for the engagement lever and a fitting portion that is provided at a lower end of the vertical plate-shaped portion and includes a plurality of fitting pieces sandwiching the lateral plate portion in an up-down direction.

That is, by providing the pressing portion for the engagement lever on the connecting member that is moved integrally with the moving body, it is possible to accurately control the engagement and disengagement of the engagement lever with the driven member in conjunction with the moving member that is moved in the deployment and housing directions. Accordingly, a stable operation can be ensured.

Further, an assembly operation can be facilitated by adopting a configuration in which the moving member is connected to the connecting member by fitting. Tilting of the vertical plate-shaped portion provided on the connecting member can be prevented by sandwiching the lateral plate portion of the moving member in the up-down direction using the plurality of fitting pieces. Accordingly, the increase in the sliding resistance due to a change in moving postures of the connecting member and the moving member can be avoided.

It is preferable that the vehicle slope apparatus according to the above aspect includes a housing stopper configured to restrict the movement of the moving member toward the housing direction exceeding a predetermined housing position by abutting with the moving member being moved in the housing direction, and the housing stopper is disposed at a position where the housing stopper abuts with the moving member in a state where the housing stopper and the fitting portion of the connecting member are disposed adjacently in the deployment and housing directions.

That is, the moving member is moved integrally with the connecting member based on the driving force transmitted via the drive cable. Therefore, the housing stopper can efficiently receive a load of the moving member by adopting the above configuration. Accordingly, the posture of the moving member abutted with the housing stopper can be stably maintained. As a result, it is possible to eliminate a setting of an excessive strength margin and reduce a weight of the moving member.

According to the present disclosure, the sliding resistance can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle slope apparatus comprising:
   a slope plate configured to be deployed at a lower end of a door opening portion;
   a guide rail extending in deployment and housing directions of the slope plate;
   a moving member configured to move along an extending direction of the guide rail;
   a support arm rotatably connected to a rear end of the slope plate and rotatably connected to the moving member, the support arm is provided with a roller configured to hold a moving posture of the slope plate by being in sliding contact with the guide rail in a state where the slope plate is moved integrally with the moving member;
   a lift mechanism configured to lift the rear end of the slope plate by rotating the support arm in a state where the slope plate is deployed; and
   a roller cover configured to cover the roller from above in a state where the rear end of the slope plate is lifted up due to the rotation of the support arm.

2. The vehicle slope apparatus according to claim 1, wherein
   the roller cover is provided on the support arm and rotates integrally with the support arm so as to be disposed at a position where the roller cover covers the roller from above.

3. The vehicle slope apparatus according to claim 1, wherein
   the lift mechanism includes:

a driven member having a connecting shaft for the support arm and configured to be moved together with the support arm in the extending direction of the guide rail, and a deployment stopper configured to abut with the driven member moving toward a deployment direction so as to restrict movement of the driven member, and the vehicle slope apparatus further comprises:

an engagement lever configured, when the moving member is moved in the deployment direction in a state where the movement of the driven member toward the deployment direction is restricted, and thus the support arm rotates around the connecting shaft of the driven member to lift up the rear end of the slope plate, to be engaged with the driven member, in a state where the driven member abuts with the deployment stopper, so as to restrict the movement of the driven member toward the housing direction, when the driven member moves to a position where the driven member abuts with the deployment stopper, the engagement lever is pressed by the driven member and rotates in a first direction so as to allow the movement of the driven member toward the deployment direction, and the engagement lever is pressed by a pressing portion, provided integrally with the moving member that is moved in the deployment direction in a state where the driven member abuts with the deployment stopper, and rotates in a second direction so as to be engaged with the driven member, and rotation of the engagement lever in the first direction is restricted by the pressing portion located in the first direction.

4. The vehicle slope apparatus according to claim 3, wherein the driven member includes an engaging piece configured to abut with the deployment stopper and be engaged with the engagement lever in a state of being sandwiched between the deployment stopper and the engagement lever.

5. The vehicle slope apparatus according to claim 3, wherein the driven member has a folded plate shape and includes a first vertical plate portion and a second vertical plate portion disposed at positions displaced in a width direction of the guide rail.

6. The vehicle slope apparatus according to claim 3, further comprising:

a falling prevention member rotatably connected to the slope plate;

an urging member configured to urge the falling prevention member to stand up at a side end of the slope plate; and a pressing member configured to abut with the falling prevention member and press the falling prevention member so as to cause the falling prevention member to be tilted on an upper surface of the slope plate against an urging force of the urging member, the falling prevention member being moved downward together with the slope plate due to the rotation of the support arm that pulls down the lifted rear end of the slope plate, wherein the pressing member is provided on the driven member and is disposed at a position where the pressing member abuts with the falling prevention member by being inserted into a slit formed at the side end of the slope plate, and the pressing member includes a flexible abutting piece curved in a width direction of the slope plate and configured to abut with a sidewall surface of the slit.

7. The vehicle slope apparatus according to claim 3, further comprising:

a connecting member connected to the moving member in a state of being fixed to a drive cable so as to be moved integrally with the moving member based on a driving force transmitted via the drive cable, wherein the moving member has a folded plate shape and includes a lateral plate portion to which the connecting member is connected and a vertical wall portion to which the support arm is connected, and the connecting member is connected to the moving member and includes a vertical plate-shaped portion constituting the pressing portion for the engagement lever, and a fitting portion that is provided at a lower end of the vertical plate-shaped portion and includes a plurality of fitting pieces sandwiching the lateral plate portion in an up-down direction.

8. The vehicle slope apparatus according to claim 7, further comprising:

a housing stopper configured to restrict the movement of the moving member toward the housing direction exceeding a predetermined housing position by abutting with the moving member being moved in the housing direction, wherein the housing stopper is disposed at a position where the housing stopper abuts with the moving member in a state where the housing stopper and the fitting portion of the connecting member are disposed adjacently in the deployment and housing directions.

* * * * *